US012692001B2

(12) United States Patent
Zadra et al.

(10) Patent No.: US 12,692,001 B2
(45) Date of Patent: Jul. 28, 2026

(54) METHODS AND SYSTEMS FOR DEPLOYING A PAYLOAD FROM AN AERIAL VEHICLE ONTO A TARGET SURFACE

(71) Applicant: Ocean Alliance, Inc., Gloucester, MA (US)

(72) Inventors: Christopher James Zadra, Gloucester, MA (US); Iain Alistair Eddy Kerr, Gloucester, MA (US)

(73) Assignee: Ocean Alliance, Inc., Gloucester, MA (US)

( * ) Notice: Subject to any disclaimer, the term of this patent is extended or adjusted under 35 U.S.C. 154(b) by 552 days.

(21) Appl. No.: 18/359,785

(22) Filed: Jul. 26, 2023

(65) Prior Publication Data
US 2024/0034468 A1     Feb. 1, 2024

Related U.S. Application Data

(60) Provisional application No. 63/369,993, filed on Aug. 1, 2022.

(51) Int. Cl.
| | |
|---|---|
| *B64D 1/08* | (2006.01) |
| *A01K 11/00* | (2006.01) |
| *A01K 61/90* | (2017.01) |

(52) U.S. Cl.
CPC .............. B64D 1/08 (2013.01); A01K 11/006 (2013.01); A01K 61/90 (2017.01)

(58) Field of Classification Search
CPC ......... B64D 1/08; A01K 11/006; A01K 61/90
See application file for complete search history.

(56) References Cited

U.S. PATENT DOCUMENTS

| | | |
|---|---|---|
| 4,572,053 A | 2/1986 | Sosnowski et al. |
| 8,196,866 B2 * | 6/2012 | Edelstein ................. B64D 1/06 |
| | | 294/82.26 |

(Continued)

FOREIGN PATENT DOCUMENTS

| | | | |
|---|---|---|---|
| KR | 2018069596 | 6/2018 | |
| WO | WO-2018033812 A1 * | 2/2018 | ............. B64U 20/87 |

OTHER PUBLICATIONS

Baumgertner and Mate, "Summertime foraging ecology of North Atlantic right whales", Mar. Ecol. Prog. Ser. 264: 123-135, Dec. 15, 2003, Retrieved from: http://dx.doi.org/10.3354/meps264123.

(Continued)

*Primary Examiner* — Valentina Xavier
(74) *Attorney, Agent, or Firm* — Knobbe, Martens Olson & Bear, LLP

(57) ABSTRACT

A system for deploying a payload from an aerial vehicle onto a target surface includes a delivery device that is detachably couplable to the aerial vehicle. The delivery device includes an elongated shaft comprising a proximal end and a distal end, a plurality of fins extending along the plurality of the shaft, and a payload holder coupled to the distal end of the elongated shaft. The delivery device may additionally include an attachment portion and a floatation device. The payload holder may be detachably coupled to the payload such that the delivery device detaches from payload upon impact at the target surface. The system may additionally include a release mechanism for detachably coupling the delivery device to the aerial vehicle. The release mechanism includes a receiver and a dropper device. The release mechanism may be remotely controlled by an operator to release the delivery device from the aerial vehicle.

20 Claims, 12 Drawing Sheets

(56) References Cited

U.S. PATENT DOCUMENTS

| | | | |
|---|---|---|---|
| 9,896,182 B1 | 2/2018 | Beckman et al. | |
| 10,589,853 B2 | 3/2020 | Lee | |
| 11,667,383 B2* | 6/2023 | Evans, II | B64D 1/12 |
| | | | 244/137.4 |
| 11,719,504 B1 | 8/2023 | Kopman | |
| 12,259,210 B1 | 3/2025 | Dullea | |
| 2018/0135798 A1 | 5/2018 | Griffin | |
| 2020/0094962 A1 | 3/2020 | Sweeny | |
| 2020/0140078 A1 | 5/2020 | Lu | |
| 2021/0271267 A1 | 9/2021 | Thomas | |
| 2022/0332404 A1 | 10/2022 | Johnson | |
| 2023/0113569 A1 | 4/2023 | Marcel | |
| 2023/0331384 A1 | 10/2023 | Parraga et al. | |
| 2024/0114821 A1 | 4/2024 | Thota | |
| 2024/0383604 A1* | 11/2024 | Marshman | B65D 33/14 |
| 2025/0100681 A1* | 3/2025 | Seki | B64D 1/02 |
| 2025/0136275 A1* | 5/2025 | Prager | B64D 1/08 |
| 2025/0171144 A1* | 5/2025 | Godfrey | B64U 10/13 |

OTHER PUBLICATIONS

Blair et al., "Evidence for ship noise impacts on humpback whale foraging behaviour", Biol. Lett, 12, Jul. 12, 2016, Retrieved from: http://dx.doi.org/10.1098/rsbi_2016.0005.

Burgess, "Development of a Wideband Acoustic Recording Tag to Assess the Acoustic Behavior of Marine Wildlife", Technical Report GS0118A-1001, Jan. 2010, Retrieved from: https://www.researchgate.net/publication/235119411_Development_of_a_Wideband_Acoustic_Recording_Tag_to_Assess_the_Acoustic_Behavior_of_Marine_Wildlife.

Burgess, "The Acousonde: A miniature autonomous wideband recorder", J Acoust Soc Am 125, 2588, Apr. 8, 2009, Retrieved from: https://pubs.aip.org/asa/iasa/article/125/4_Supplement/2568/714663/The-Acousonde-miniature-autonomous-wideband.

Cade et al., "Kinematic Diversity in Rorqual Whale Feeding Mechanisms", Current Biology, vol. 26, Iss. 19, p. 2617-2624, Oct. 10, 2016, Retrieved from: https://linkinghub.elsevier.com/retrieve/pii/S0960982216307836.

Calambokedis et al., "Differential Vulnerability to Ship Strikes Between Day and Night for Blue, Fin, and Humpback Whales Based on Dive and Movement Data From Medium Duration Archival Tags", Front. Mar. Sci., Sec. Marine Conservation and Sustainability, vol. 6, Sep. 13, 2019, Retrieved from: http://dx.doi.org/10.3389/fmarrs.2019.00543.

Friedleander et al., "Diel changes in humpback whale *Megaptera novaeangliae* feeding behavior in response to sand lance *Ammodytes* spp. behavior and distribution", MEPS 395:91-100, Dec. 3, 2009, Retrieved from: http://www.int-res.com/abstracts/meps/v395/p91-100/.

Goldbogen and Madsen, "The largest of August Krogh animals: Physiology and biomechanics of the blue whale revisited," Comparative Biochemistry and Physiology Part A: Molecular & Integrative Physiology, vol. 254, Apr. 2021, Retrieved from https://www.sciencedirect.com/science/article/abs/pii/s1095643320302476.

Gough et al., "Scaling of swimming performance in baleen whales", Journal of Experimental Biology (2019) 222, Mar. 29, 2019, Retrieved from: http://dx.doi.org/10.1242/leb.204172.

Hazen et al., "Blue whales (*Balaenoptera musculus*) optimize foraging efficiency by balancing oxygen use and energy gain as a function of prey density", Sci. Adv., Oct. 2, 2015, Retrieved from: http://dx.doi.org/10.1126/sciadv.1500469.

Holton et al., "Animal tag technology keeps coming of age: an engineering perspective", Phil. Trans. R. Soc. B, 376, Aug. 2021, Retrieved from: http://dx.doi.org/10.1098/rstb.2020.0229.

Kvadsheim et al., "Cetaceans and naval sonar—the 3S-2009 cruise report", FFI, Jul. 1, 2009, Retrieved from: https://publications.ffi.no/en/item/cetaceans-and-naval-sonar-the-3s-2009-cruise-report.

Linsky et al., "The scale of the whale: using video-tag data to evaluate sea-surface ice concentration from the perspective of individual Antarctic minke whales", Anim Biotelemetry (2020) 8:31, Oct. 12, 2020, Retrieved from: https://animalbiotelemetry_biomedcentral.com/articles/10.1186/s40317-020.00218-8.

McIntyre "Trends in tagging of marine mammals: a review of marine mammal biologging studies", African Journal of Marine Science, vol. 36, Iss. 4, Jul. 1, 2014, Retrieved from: https://www.tandfonline.com/dol/abs/10.2989/1814232X.2014.978655.

Miller et al. "Using at-sea experiments to study the effects of airguns on the foraging behavior of sperm whales in the Gulf of Mexico", Deep Sea Research Part 1: Oceanographic Research Papers, vol. 56, Iss 7, Jul. 2009, Retrieved from: https://linkinghub.elsevier.com/retrieve/pii/S0967063709000508.

Murakami et al. "Logger Attaching System for Sperm Whales Using a Drone", JRM,, vol. 33, No. 3, pp. 475-483, Jun. 20, 2021, Retrieved from: http://dx.doi.org/10.20965/irm.2021.p0475.

Nowacek et al., "Buoyant balaenids: the ups and downs of buoyancy in right whales", Proc. R. Soc. Lond. B (2001) 268, 1811-1816, May 4, 2001; Retrieved from: https://www.ncbi.nlm.nih.gov/pmc/articles/PMC1088813/pdf/PB011811.pdf.

Oleson et al., "Behavioral context of call production by eastern North Pacific blue whales", MEPS 330:269-284, Jan. 25, 2007 Retrieved from: https://www.int-res.com/abstracts/meps/v330/p269-284/.

Parks et al, "Dangerous dining: surface foraging of North Atlantic right whales increases risk of vessel collisions", Aug. 3, 2011, Retrieved from: https://dx.doi.org/10.1098/rsbl.2011.0578.

Raoult et al., "Operational Protocols for the Use of Drones in Marine Animal Research ", Drones 2020 4, 64, Retrieved from: https://www.mdpi.com/2504-446X/4/4/64.

Savoca et al., "Baleen whale prey consumption based on high-resolution foraging measurements", Nature vol. 599, pp. 85-90, Nov. 3, 2021, Retrieved from: http: http://dx.doi.org/10.1038/s41586-021-03991-5.

Segre et al. "Biomechanically distinct filter-feeding behaviors distinguish sei whales as a functional intermediate and ecologically flexible species", Journal of Experimental Biology (2021) 224, Mar. 24, 2021, Retrieved from: http://dx.doi.org/10.1242/jeb.238873.

Segre et al., "Energetic and physical limitations on the breaching performance of large whales", eLife, Jan. 29, 2020, Retrieved from: https://elifesciences.org/articles/51760.

Stimpert et al., "Sound production and associated behavior of tagged fin whales (*Balaenoptera physalus*) in the Southern California Bight", Animal Biotelemetry vol. 3, Article No. 23, Aug. 3, 2015, Retrieved from: http://dx.doi.org/10.1186/s40317-015-0058-3.

Tyack and Johnson, "A digital acoustic recording tag for measuring the response of wild marine mammals to sound", IEEE Journal of Oceanic Engineering, vol. 28, Iss. 1, Jan. 2003.

Ware et al., "Bottom side-roll feeding by humpback whales (*Megaptera novaeangliae*) in the southern Gulf of Maine, U.S.A", Jul. 24, 2013, Retrieved from: https://onlinelibrary.wiley.com/doi/10.111/mms.12053.

Zhang et al., "Pose-gait analysis for cetacean biologging tag data", PLoS One 17(9), Dec. 7, 2021, Retrieved from: https://journals.plos.org/plosone/article?id=10.1371/journal.pone.0261800.

* cited by examiner

502

METHODS AND SYSTEMS FOR DEPLOYING A PAYLOAD FROM AN AERIAL VEHICLE ONTO A TARGET SURFACE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority to U.S. Application No. 63/369,993, filed Aug. 1, 2022, the entire contents of which are hereby incorporated by reference.

BACKGROUND

Field of the Invention

The present disclosure relates generally to systems and methods for deploying a payload onto a target from an aerial vehicle. More particularly, the present disclosure relates to systems and methods for deploying from a drone a biologging tag or other tracking device onto a target, for example, a marine mammal.

Description of the Related Art

Biologging tags have become an important tool that can be used for studying free-swimming marine mammals around the world (McIntyre 2014, Raoult et al. 2020, Holton et al. 2021). Biologging tags have provided important and novel information relative to the behavioral ecology of large whales, often with the goal of mitigating anthropogenic interactions such as entanglement or ship strike (Parks et al. 2011, Calambokedis et al. 2019) or reaction to noise (Blair et al. 2016). To date, biologging tags have provided important information for humpback (*Megaptera novaeangliae*) (Friedleander et al. 2009, Parks et al. 2011, Ware et al. 2013), blue (*Balaenoptera musculus*) (Oleson et al. 2007; Hazen et al. 2015, Goldbogen and Madsen 2021), sperm (*Physeter macrocephalus*) (Miller 2009), sei (*Balaenoptera borealis*) (Segre et al. 2021), North Atlantic right (*Eubalaena: glacialis*) (Baumgertner and Mate 2003, Parks et al. 2011), fin (*Balaenoptera physalus*) (Stimpert et al. 2015) and minke (Linsky et al. 2020) whales. Biologging tags have also provided insights into swimming biomechanics (Gough et al. 2019, Zhang et al. 2021), particular behaviors such as breaching mechanics (Segre et al. 2020) and ecosystem function (Savoca et al. 2021).

A variety of biologging suction cup attached tags have been developed for large whales including DTAGs (Tyack and Johnson 2003), CATS tags (Cade et al. 2016), and Bioacoustic (B)-Probes (Burgess 2009, Burgess 2010). A common denominator for all these tags is a delivery method using a small boat to approach within meters of the whale, after which a pole is used to affix a tag to the animal (i.e., pole-tagging, see Nowacek et al. 2001; Friedleander et al. 2009 and Parks et al. 2011). An alternative method has been developed for using a pressurized pneumatic system to launch tags from up to 12 m using an ARTs system (Kvadsheim et al. 2009). The advantages of these approaches are that they have been successfully used in the past on a variety of species and a number of organizations have developed considerable infrastructure and expertise for their use. The disadvantages involve the need to closely approach animals with associated harassment possibilities (e.g., physical disturbance and/or noise) and the possibility of whales and/or people being injured. An additional disadvantage is the distance that the approach boat often needs to transit when a whale surfaces, which can require high speed to reach the whale before it dives and/or repeated repositioning of the boat in hopes that the whale will surface in the immediate vicinity. These methods usually require multiple approaches and considerable time to be successful, which can limit the number of animals tagged during a project.

Recently, aerial deployment of biologging tags from aerial vehicles has been investigated as a novel means for tagging whales and other wildlife. The first description of a UAV deployment of a biologging tag was published in 2021, describing a system for deployment of tags on sperm whales (Murakami et al. 2021). However, field testing of their system resulted in only two partial tag attachments out of eleven deployments. Furthermore, in both of those partial attachments, the partially attached tag prematurely peeled off from the body of the whale resulting in unsuccessful deployments. While there are many potential advantages of using aerial vehicles for tagging large whales, aerial vehicles have not been widely adopted for this purpose. The irregular shape, center of mass, and aerodynamic properties of many biologging tags present obstacles for their successful deployment from an aerial vehicle and attachment onto a marine mammal. For instance, many biologging tags experience undesirable pitching, rolling, spinning, and/or tumbling during freefall. As a result, biologging tags commonly impact the marine mammal in an orientation that is not conducive to tag attachment (e.g., with the suction cups not facing downwards). As a result, improved systems and methods for attaching biologging tags are needed. More generally, improved systems and methods for deploying a payload are needed.

SUMMARY

The systems, methods, and devices described herein have innovative aspects, no single one of which is indispensable or solely responsible for their desirable attributes. Without limiting the scope of the claims, some of the advantageous features will now be summarized.

The present disclosure includes systems and methods for deploying a payload from an aerial vehicle onto a target surface. In one aspect, the present disclosure includes the use of unmanned aerial vehicles (UAVs) as a platform for tagging free-swimming whales. There are several potential advantages to using UAVs for tagging activities. First, the speed, maneuverability, and situational awareness of an UAV is vastly superior to that of traditional approach vessels. For example, many commercially available UAV can quickly reach speeds in excess of 50 km/hr., meaning the approach boat and UAV operator can be hundreds of meters from a surfacing animal, and the UAV can be launched and positioned over the whale to attempt tag attachment on that same surfacing. In addition, the extreme maneuverability of the UAV and its constant birds-eye view means that, in optimal conditions, the UAV pilot can track the target whale when it is traveling subsurface between ventilations, thereby maintaining an optimal position for tagging at each surfacing. Therefore, the use of UAVs in tagging activities could (1) reduce the need to closely approach animals, (2) reduce the close-approach related vessel disturbance to which animals are subjected, (3) reduce the time and number of approaches needed to attach a tag, (4) reduce the potential of the vessel striking a whale during tag approaches, and (5)

reduce the possibility of people being inadvertently injured by the whale during tagging operations.

Additionally, the use of UAVs, instead of traditional tagging methods, allows teams to increase the number of tagged animals and successful tag deployments in the same amount of time. By reducing the number of tagging attempts, the stress of the tagging process is greatly reduced for both the whales and the scientists. Incorporating the use of UAVs and advanced tagging systems enables researchers to study vulnerable or difficult to study species of whales, with minimal disruption to their habitats. Reducing disruptions to the whales' normal behaviors often yields more consistent and quality data. Furthermore, the maneuverability and efficiency of drone tagging methods can enable researchers to specifically target which whales they would like to tag, as the method does not rely as much on opportunity as previous tagging methods. For example, if researchers wanted to only tag calves, UAV tagging could enable the targeting of only the calves with minimal disruption to the whales. The combination of efficiency, precision, and minimal disruption may compound to greatly enhance the yield and quality of data collected during tagging activities.

Other tag attachment methods often use mechanisms that pierce the skin of the animal. However, the use of suction cups with the tags, instead of hooks, needles, or barbs, may reduce the stress and disruption on the target marine mammal. Suctions cups also allow the tags to automatically detach themselves after a period with no lasting damage. However, there is a need for a deployment system for delivering tags with suction cups to improve both data quality and quantity.

The present disclosure provides, among other things, an apparatus and method for deploying a payload from an aerial vehicle onto a target surface.

In one aspect described herein, a system for deploying a payload from an aerial vehicle onto a target surface comprises a delivery device having an elongated shaft with a proximal end and a distal end, a plurality of fins extending along the elongated shaft, an attachment portion coupled to the proximal end of the elongated shaft, wherein the attachment portion is detachably couplable to the aerial vehicle, and a payload holder coupled to the distal end of the elongated shaft, wherein the payload holder is detachably couplable to the payload, wherein the payload holder is configured to detach from the payload in response to the delivery device impacting the target surface, and a release mechanism coupled to the aerial vehicle, the release mechanism having a wireless receiver configured to receive a signal from a transmitter and a dropper device electrically coupled to the wireless receiver and detachably couplable to the attachment portion of the delivery device, wherein the dropper device is configured to detach from the attachment portion in response to the wireless receiver receiving a signal from the transmitter to release the delivery device.

In another aspect described herein, a system for deploying a payload from an aerial vehicle onto a body of an animal comprises a delivery device detachably couplable to the aerial vehicle having an elongated shaft comprising a proximal end and a distal end, a plurality of fins extending along the elongated shaft, and a payload holder coupled to the distal end of the elongated shaft, wherein the payload holder is detachably couplable to the payload, wherein the payload holder is configured to detach from the payload in response to the delivery device impacting the body of the animal.

In another aspect described herein, a method for deploying a payload from an aerial vehicle onto a target surface comprises detachably coupling a delivery device to the aerial vehicle via a dropper device, wherein the delivery device comprises: an elongated shaft comprising a proximal end and a distal end, a plurality of fins extending along the elongated shaft, and a payload holder coupled to the distal end of the elongated shaft, wherein the payload holder is detachably couplable to the payload, positioning the aerial vehicle substantially above the target surface, receiving a signal at a wireless receiver to detach the delivery device from the aerial vehicle, transmitting the signal from the wireless receiver to the dropper device, detaching the delivery device from the aerial vehicle via the dropper device, impacting the delivery device onto the target surface, and detaching the delivery device from the payload.

BRIEF DESCRIPTION OF THE DRAWINGS

The features and advantages of the methods and systems described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. In some instances, the drawings may not be drawn to scale.

DETAILED DESCRIPTION

Figure 1:
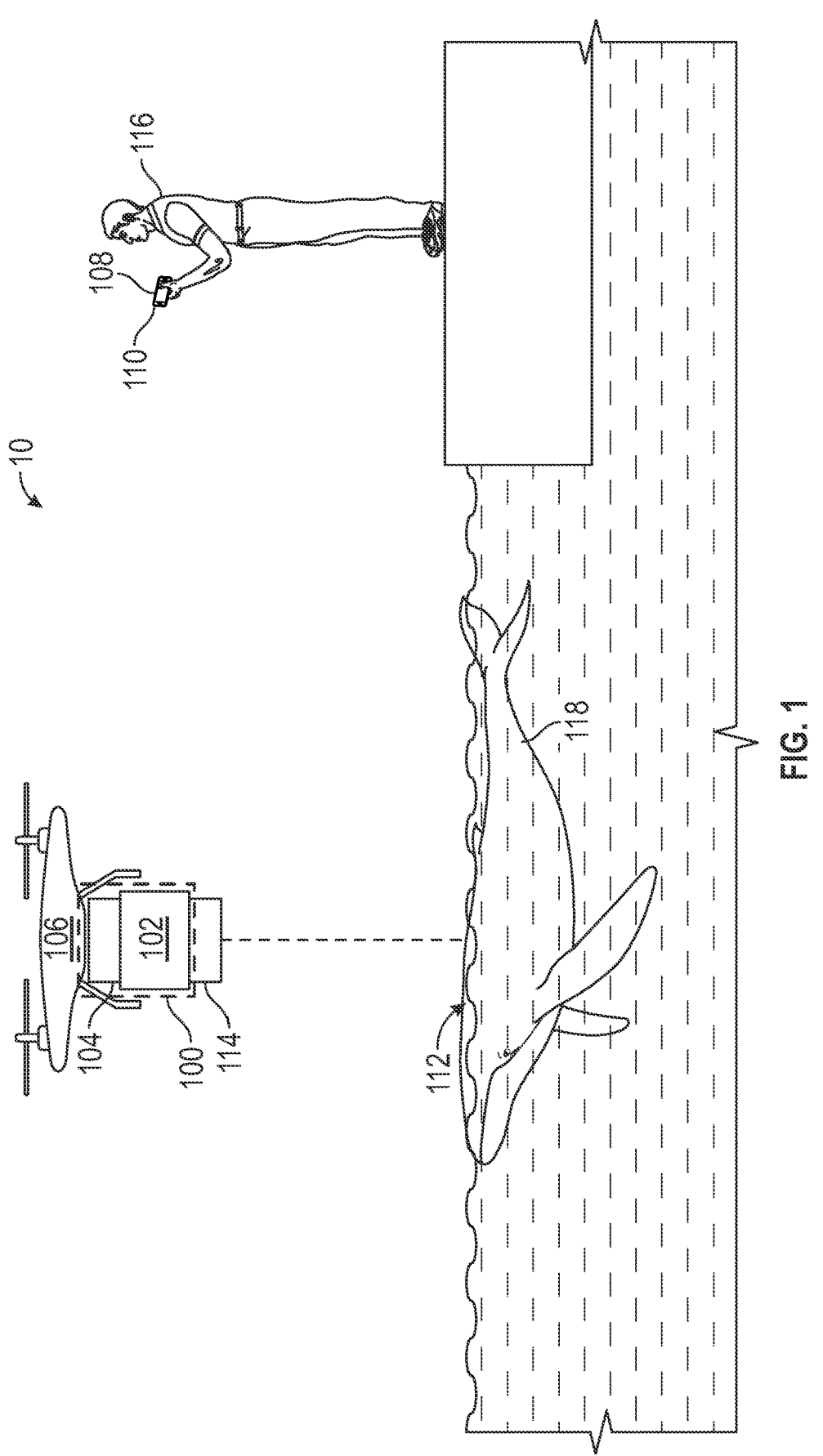
FIG. 1 depicts an exemplary scenario in which a system for deploying a payload from an aerial vehicle onto a target surface may be utilized according to an embodiment.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and form part of this disclosure. For example, a system or device may be implemented, or a method may be practiced, using any number of the aspects set forth herein. In addition, such a system or device may be implemented, or such a method may be practiced, using other structure, functionality, or structure and functionality in addition to or other than one or more of the aspects set forth herein. Alterations and further modifications of the inventive features illustrated herein, and additional applications of the principles of the inventions as illustrated herein, which would occur to one skilled in the relevant art and having possession of this disclosure, are to be considered within the scope of the invention. Descriptions of unnecessary parts or elements may be omitted for clarity and conciseness, and like reference numerals refer to like elements throughout.

As used herein, the term "aerial vehicle" refers to any aircraft, vehicle, object, device, or machine that is capable of flight. An aerial vehicle may take a variety of forms including, but not limited to, a rotorcraft such as a helicopter or multicopter, a fixed-wing aircraft, a jet aircraft, a ducted fan aircraft, a lighter than air dirigible such as a blimp or steerable balloon, a tail sitter aircraft, a glider aircraft, a paramotor, an unmanned aerial vehicle, or the like.

As used herein, the term "detachably coupled" or "detachably couplable" refers to a relationship between two or more components in which the components may be readily coupled to and uncoupled from one another. The coupling of components may be direct or indirect. Direct coupling refers to the coupling of a first component to a second component without any intermediary components between the first and second components. Indirect coupling refers to the coupling of a first component to a second component with one or more intermediary components between the first and second components. Components may be physically coupled to one another or electrically coupled to one another.

FIG. 1 depicts an exemplary scenario 10 in which a system 100 for deploying a payload 114 from an aerial vehicle 106 onto a target surface 112 may be utilized according to an embodiment. The system 100 for deploying a payload 114 from an aerial vehicle 106 onto a target surface 112 may comprise a delivery device 102 and/or a release mechanism 104. In the illustrated embodiment, a delivery device 102 is detachably coupled to and carried by an aerial vehicle 106. The delivery device 102 is coupled to the aerial vehicle 106 via a release mechanism 104 attached to the underside of the aerial vehicle 106. A payload 114 is detachably coupled to the delivery device 102. In the illustrated embodiment, an operator 116 uses a controller 108 to maneuver and position the aerial vehicle 106 substantially above a target surface 112. Once the aerial vehicle 106 is substantially above the target surface 112, the operator 116 may use a transmitter 110 to transmit a signal to the release mechanism 104 instructing the release mechanism 104 to release the delivery device 102. After release, the delivery device 102 falls from the aerial vehicle 106 and impacts the target surface 112. In response to impacting the target surface 112, the delivery device 102 detaches from the payload 114. In some embodiments, the delivery device 102 may be recovered after impact and reused for additional payload 114 deployments.

More specifically, FIG. 1 depicts an example scenario 10 in which an embodiment may be used to attach a biologging tag onto a marine mammal 118. In the illustrated embodiment, the aerial vehicle 106 comprises an unmanned aerial vehicle (UAV). The terms "unmanned aerial vehicle" or "UAV" refer to any autonomous or semi-autonomous aerial vehicle that is capable of performing one or more flight-related functions without a physically present human pilot. Some functions may be controlled by a remote operator 116, while other functions may be performed autonomously. The terms "drone", "unmanned aerial vehicle system" ("UAVS"), or "uncrewed aerial system" ("UAS") may also be used to refer to a UAV. The UAV may be remotely controlled by an operator 116. In some embodiments, the operator 116 may be located on land, in a watercraft, or in another aerial vehicle 106. In some embodiments, the unmanned aerial vehicle may be a DJI MATRICE M210 V2 or DJI INSPIRE 2 equipped with a ZENMUSE X4S camera.

A target surface 112 may be any surface, object, location, region, area, or the like onto which a payload 114 is desired to be deployed, impacted, or delivered. In the illustrated embodiment, the target surface 112 is located on the exterior surface of a marine mammal 118, such as a whale. In other embodiments, the target surface 112 may be located on other types of animals, including but not limited to marine mammals or animals, for example, dolphins, manatees, and sharks; land animals including but not limited to giraffes, rhinos, and elephants; and semiaquatic animals including but not limited to crocodiles, hippos, and polar bears. Additionally, in other embodiments the target surface 112 may be located on inanimate objects, for example, movable inanimate objects.

A payload 114 may be any cargo, package, device, machine, object, or the like that may be carried and released by an aerial vehicle 106. In the illustrated embodiment, the payload 114 comprises a biologging tag. A biologging tag is any device that may be used to detect, measure, or record biological or positional information corresponding to an animal. Biologging tags may comprise one or more suction cups for attachment to the animal. In some embodiments, the biologging tag may be a suction-cup equipped DTAGs (TYACK AND JOHNSON 2003) or CATS tags (CUSTOM ANIMAL TRACKING SOLUTIONS).

In the illustrated embodiment, the operator 116 uses a controller 108 to maneuver and position the UAV substantially above the marine mammal 118. The UAV may comprise one or more imaging systems. For example, one or more still and/or video cameras may be utilized by the UAV to capture image data of the UAV's environment. The UAV may stream a video feed or a sequence of still images from the UAV's imaging system to a screen viewable by the operator 116. As the marine mammal 118 is swimming or moving, the operator 116 may utilize the live-feed video to maneuver the UAV to locate and follow the marine mammal 118. As the operator 116 is maneuvering the UAV to be substantially above the marine mammal 118, the operator 116 may wait until the target surface 112 of the marine mammal 118 breaches above the water level. When the UAV is positioned substantially above the marine mammal 118 and the target surface 112 of the marine mammal 118 is above the water level, the operator 116 may use the transmitter 110 to transmit a signal to the release mechanism 104 to release the delivery device 102. Upon receipt of that signal at the release mechanism 104, the release mechanism 104 releases the delivery device 102, allowing the delivery device 102 to drop downwards toward the target surface 112 on the marine mammal 118. While in free-fall, the delivery device 102 is configured to assume an orientation in which the payload 114 is the leading portion of the delivery device 102. When the delivery device 102 falls in this orientation, the payload 114 is the first object to impact the target surface 112. If the payload 114 is a biologging tag with suction cups disposed on the bottom of the biologging tag, then the suction cups impact the target surface 112 of the marine mammal 118 and attach the biologging tag to the marine mammal 118. The delivery device 102 may detach from the payload 114 as a result of the change in momentum caused by the impact. After impact, the delivery device 102 may fall into the surrounding water or environment, while the biologging tag remains attached to the marine mammal 118.

Dimensions of device components may vary depending on the payload being deployed, the size of the animal, water conditions of the ocean, weather conditions during deployment, and many other factors playing into the process. The method and technique for successful deployment of the tag may vary as well due to the same factors.

For example, the delivery device 102 may be released from the aerial vehicle 106 at a height range (above a target surface) up to 4.5 m, 5.5 m, 6.5. m, 7.5 m, 8.5 m, or up to any other desired height. In some embodiments using suction cup based biologging tags, the height may be higher so that the delivery device can sufficiently accelerate for the suction cups to couple to the target surface 112. In some embodiments, the payload 114 may be a DTAG.

In some embodiments, the payload 114 may be heavy enough so that additional components of the delivery device 102 are unnecessary for orientation during the drop. The payload 114 may be detachably coupled directly to the release mechanism 104. In these embodiments, the delivery device 102 may be released from the aerial vehicle 106 at a distance of 2.5 m, 3.5, 4.5 m, or up to any other desired height. In some embodiments, the payload is released at a lower height so that the payload 114 maintains orientation during descent. A heavier payload may impact the target surface 112 with enough force for the suction cups to couple the target surface 112 at lower heights. In some embodiments, the payload 114 may be a CATS tag.

In some embodiments, the distance between the site of deployment for the aerial vehicle 106 and the release of the delivery device 102 and/or the payload 114 can be about 90 m, 200 m, 300 m, 400 m, 500 m, 600 m, 700 m, 800 m, 900 m, 1000 m, 1048 m, or up to any desired distance.

Figure 2:
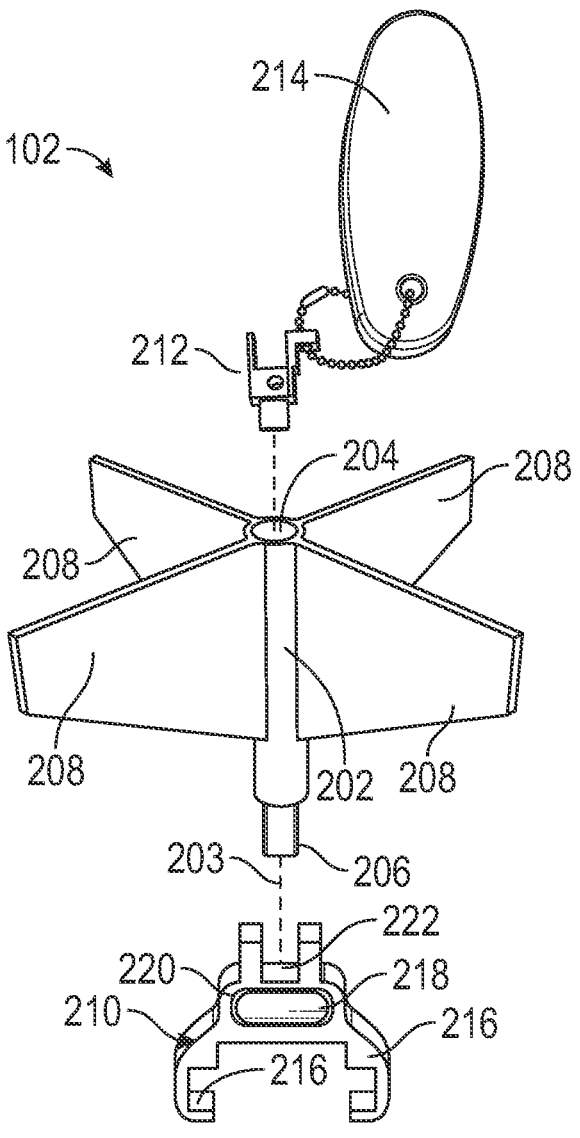
FIG. 2 depicts an exploded view of example components of a delivery device according to an embodiment.

FIG. 2 depicts an exploded view of example components of a delivery device 102 according to an embodiment. In the illustrated embodiment, the delivery device 102 comprises an elongated shaft 202, a plurality of fins 208, a payload holder 210, an attachment portion 212, and a floatation device 214.

The elongated shaft 202 comprises a proximal end 204 and a distal end 206. The proximal end 204 of the elongated shaft 202 may refer to the trailing end of the elongated shaft 202 when the delivery device 102 is in free-fall. In some embodiments, the proximal end 204 of the elongated shaft 202 refers to the end of the elongated shaft 202 that is located proximal to the aerial vehicle 106. The distal end 206 of the elongated shaft 202 may refer to the leading end of the elongated shaft 202 when the delivery device 102 is in free-fall. In some embodiments, the distal end 206 of the elongated shaft 202 refers to the end of the elongated shaft 202 that is located distal to the aerial vehicle 106. In the illustrated embodiment, the elongated shaft 202 forms a generally cuboid shape, with a substantially square cross section. In other embodiments, the elongated shaft 202 may form any other shape, such as a triangular prism, cylinder, or the like. Additionally, in other embodiments, the cross section may be any shape, such as a circle, triangle, rectangle, or the like. The elongated shaft 202 provides a support structure onto which the plurality of fins 208 may be attached. Additionally, the elongated shaft 202 provides attachment points at the proximal end 204 and distal end 206 for coupling of an attachment portion 212 and/or payload holder 210 to the delivery device 102. In the illustrated embodiment, the proximal end 204 comprises a circular hole positioned on a longitudinal axis of the elongated shaft 202 into which the attachment portion 212 may be inserted. The "center" location for the attachment portion 212 may provide the least amount of alteration of flight of the delivery device 102. In the illustrated embodiment, a flattened portion is disposed at the distal end 206 of the elongated shaft 202. The flattened portion is dimensioned for insertion into an attachment slot 222 formed in the payload holder 210. In some embodiments, the circular hole at the proximal end 204 may have various diameters to accommodate various sizes of attachment portions.

For example, in some embodiments, the circular hole can have a diameter of 0.39 inches, plus or minus about 20% (e.g., plus or minus 0.078 inches). In some embodiments, the diameter of the circular hole may be between 0.25 and 0.55 inches. In some embodiments, the diameter of the circular hole can be any of, or between any two, of the following dimensions: 0.25 inches, 0.26 inches, 0.27 inches, 0.28 inches, 0.29 inches, 0.30 inches, 0.31 inches, 0.32 inches, 0.33 inches, 0.34 inches, 0.35 inches, 0.36 inches, 0.37 inches, inches, 0.39 inches, 0.40 inches, 0.41 inches, 0.42 inches, 0.43 inches, 0.44 inches, 0.45 inches, 0.46 inches, 0.47 inches, 0.48 inches, 0.49 inches, 0.50 inches, 0.52 inches, 0.52 inches, inches, 0.54 inches, and 0.55 inches. However, in various embodiments, the diameter of the circular hole may be less than 0.25 inches or greater than 0.55 inches.

In the illustrated embodiment, a plurality of fins 208 extend along the longitudinal length of the elongated shaft 202. The fins 208 protrude outward from the elongated shaft 202 in a direction substantially perpendicular to a longitudinal axis 203 of the elongated shaft 202. The plurality of fins 208 may improve the stability of the delivery device 102 when in freefall by minimizing undesirable wobbling, pitching, rolling, and/or tumbling. In the illustrated embodiment, the fins 208 form a generally triangular shape with a truncated tip. In the illustrated embodiment, the plurality of fins 208 extend along the elongated shaft 202 starting from an edge at the proximal end 204. In the illustrated embodiment, the plurality of fins 208 extend along a majority of the length of the elongated shaft 202. In other embodiments, the plurality of fins 208 may extend along different portions of the elongated shaft 202 and may extend along only half or less than half of the length of the elongated shaft 202. Additionally, in some embodiments, the shape and/or size of the fins 208 may be different while performing the same function. For instance, the fins 208 may form a substantial rectangular shape. In the illustrated embodiment, the delivery device 102 comprises four fins 208, and a substantially ninety-degree angle is formed between each pair of fins 208. In other embodiments, the delivery device 102 may comprise zero, one, two, three, or any other number of fins 208. The fins 208 may have various dimensions depending on the size of the delivery device or payload.

For example, in some embodiments, the fins 208 and elongated shaft 202 can have a total end to end width of approximately 5.39 inches. In some embodiments, the end-to-end width of the fins 208 and elongated shaft 202 may be approximately 5.39 inches, plus or minus about 20% (e.g., plus or minus 1.08 inches). In various embodiments, the end-to-end width of the fins 208 and elongated shaft 202 may be between about 3 and 8 inches. In some embodiments, the end-to-end width of the fins 208 and elongated shaft 202 can be any of, or between any two, of the following dimensions: 3.0 inches, 3.5 inches, 4.0 inches, 4.5 inches, inches, 5.5 inches, 6.0 inches, 6.5 inches, 7.0 inches, 7.5 inches, and 8.0 inches. However, in various embodiments, the end-to-end width of the fins 208 and elongated shaft 202 may be less than 3.0 inches or greater than 8 inches.

For example, in some embodiments, the fins 208 and elongated shaft 202 can have a total length of approximately 4.49 inches. In some embodiments, the length of the fins 208 and elongated shaft 202 may be approximately 4.49 inches, plus or minus about 20% (e.g., plus or minus 0.9 inches). In various embodiments, the length of the fins 208 and elongated shaft 202 may be between about 3 and 7 inches. In some embodiments, the length of the fins 208 and elongated shaft 202 can be any of, or between any two, of the following dimensions: 3.0 inches, 3.5 inches, 4.0 inches, 4.5 inches, 5.0 inches, 5.5 inches, 6.0 inches, 6.5 inches, and 7.0 inches. However, in various embodiments, the length of the fins 208 and elongated shaft 202 may be less than 3.0 inches or greater than 7 inches.

The delivery device 102 may additionally comprise a payload holder 210. The payload holder 210 is disposed at the distal end 206 of the elongated shaft 202. The payload holder 210 is coupled to the elongated shaft 202 via the attachment slot 222. In the illustrated embodiment, the payload holder 210 comprises a pair of arms 216 configured to wrap around the payload 114. The pair of arms 216 are substantially arcuate in shape. A rectangular slot is formed within each arm 216 and is dimensioned to receive the payload 114. The shape, size, dimensions, and material of the arms 216 and slot may be changed to accommodate different payloads 114. A payload 114 may be inserted into the slots and held between the pair of arms 216. The payload holder 210 may exert a compressive force on the payload 114, resulting in a secure coupling. In other embodiments, the payload holder 210 may comprise any structure sufficient to securely hold a payload 114. The payload holder 210 is configured to detach from the payload 114 in response to the delivery device 102 impacting the target surface 112. Upon impact, the resulting forces translated into the delivery device 102 cause the payload holder 210 to dislodge and detach from the payload 114. Accordingly, in order to allow for reuse of the delivery device 102, the payload holder 210 may be composed of a material with a sufficient elasticity to allow for detachment from the payload 114 without incurring breakage or cracking. In other embodiments, the payload holder 210 may be a single use component that is configured to break apart upon impact. Various embodiments can have different heights for the payload holder 210, and different widths for the payload holder 210 as described in examples below.

For example, in some embodiments, the payload holder 210 can have a height of approximately 2.42 inches. In some embodiments, the height of the payload holder 210 may be approximately 2.42 inches, plus or minus about 20% (e.g., plus or minus 0.48 inches). In various embodiments height of the payload holder 210 may be between about 2 and 5 inches. In some embodiments, the height of the payload holder 210 may be any of, or between any two, of the following dimensions: 2.0 inches, 2.5 inches, 3.0 inches, 3.5 inches, 4.0 inches, 4.5 inches, and 5.0 inches. However, in various embodiments, the height of the payload holder 210 may be less than 2.0 inches or greater than 5 inches.

For example, in some embodiments, the payload holder 210 can have a width of approximately 2.85 inches. In some embodiments, the width of the payload holder 210 may be approximately 2.85 inches, plus or minus about 20% (e.g., plus or minus 0.57 inches). In various embodiments width of the payload holder 210 may be between about 2 and 5 inches. In some embodiments, the width of the payload holder 210 may be any of, or between any two, of the following dimensions: 2.0 inches, 2.5 inches, 3.0 inches, 3.5 inches, 4.0 inches, 4.5 inches, and 5.0 inches. However, in various embodiments, the width of the payload holder 210 may be less than 2.0 inches or greater than 5 inches.

In some embodiments, the payload holder 210 may comprise a weight 218. Inclusion of a weight 218 in the payload holder 210 moves the center of mass of the delivery device 102 to a location proximal to the payload 114. The increased mass at the distal end 206 of the delivery device 102 typically causes the payload 114 to make initial contact with the target surface 112. The weight 218 may be disposed inside of a compartment 220 formed in the payload holder 210. In the illustrated embodiment, the payload holder 210 comprises a compartment 220 formed in the body of the payload holder 210. In the illustrated embodiment, the compartment 220 containing a weight 218 is disposed between the pair of arms 216 and the attachment slot 222. In other embodiments, the weight 218 may be coupled to the exterior of the payload holder 210. Alternatively, the payload holder 210 itself may be comprised of a heavier material relative to the rest of the delivery device 102. In some embodiments, a weight 218 may be omitted. Various embodiments can have different weights of weight 218, and different total weights of delivery device 102 as described in examples below.

For example, in some embodiments, the weight 218 is approximately 4 oz. In some embodiments, the weight 218 may weigh approximately 4 oz plus or minus 20% (e.g., plus or minus 0.8 oz). In some embodiments, the weight 218 may have a weight between about 2 and 8 oz. In various embodiments, the weight 218 has a weight of, or between any two, of the following weights: 2.0 oz, 2.5 oz, 3.0 oz, 3.5 oz, 4.0 oz, 4.5 oz, 5.0 oz, 5.5 oz, 6.0 oz, 6.5 oz, 7.0 oz, 7.5 oz, and 8.0 oz. However, in some embodiments, a weight 218 that weighs less than 2.0 oz or greater than 8.0 oz may be used.

For example, in some embodiments, the delivery device 102 has a total weight of approximately 7 oz. In some embodiments, the delivery device 102 may have a weight of approximately 7.0 oz plus or minus about 20% (e.g., plus or minus 1.4 oz). In some embodiments, the delivery device 102 may have a weight between approximately 3 oz and 14 oz. In various embodiments, the delivery device 102 has a total weight of, or between any two, of the following weights: 3.5 oz, 4.0 oz, 4.5 oz, 5.0 oz, 5.5 oz, 6.0 oz, 6.5 oz, 7.0 oz, 7.5 oz, 8 oz, 8.5 oz, 9.0 oz, 9.5 oz, 10 oz, 10.5 oz, 11 oz, 11.5 oz, 12 oz, 12.5 oz, 13 oz, 13.5 oz, and 14 oz. However, in some embodiments, the weight of the delivery device 102 may be less than 3.5 oz or greater than 14 oz.

The delivery device 102 may comprise an attachment portion 212. The attachment portion 212 serves as a coupling point between the delivery device 102 and the release mechanism 104. The attachment portion 212 may be connected to the proximal end 204 of the elongated shaft 202. In the illustrated embodiment, the attachment portion 212 comprises a cylindrical protrusion for insertion into the circular slot of the elongated shaft 202. The attachment portion 212 comprises a connection point configured to detachably couple to the release mechanism 104. In some examples, the connection point may be a loop extending from the top surface, a hook, or an aperture. In the illustrated embodiment, the attachment portion 212 comprises a channel that is dimensioned to receive a rod 408 coupled to the release mechanism 104. The attachment portion 212 may be coupled to the release mechanism 104 via a dropper device 402. An extendable and retractable rod 408 may extend through the loop, hook, or aperture to hold the delivery device 102. In some embodiments, the attachment portion 212 is specifically fitted to detachably couple to the dropper device 402 with tight tolerances to reduce payload 114 movement while in flight. The tight fitting of the attachment portion 212 to the dropper device 402 reduces the chance of tumbling and swaying when deploying the delivery device, therefore the accuracy and consistency of the drop improves. Additionally, the attachment portion 212 may comprise a channel or other structure for connection to a floatation device 214.

The delivery device 102 may additionally comprise a floatation device 214. In the illustrated embodiment, a floatation device 214 is coupled to the attachment portion 212 via a chain. Regarding the scenario 10 in which a delivery device 102 is deployed above or near a body of water or other liquid, inclusion of a floatation device 214 ensures that the delivery device 102 will float on the surface of that liquid. Additionally, a floatation device 214 may improve an operator's 116 ability to find and recover the delivery device 102 after deployment from an aerial vehicle 106. In the illustrated embodiment, the floatation device 214 is a piece of foam material. In other embodiments, the floatation device 214 may be any material or device that causes the delivery device 102 to be neutrally or positively buoyant. In the illustrated embodiment, the floatation device 214 is a separate component that is coupled to delivery device 102. In other embodiments, the floatation device 214 may be integral to the delivery device 102, or the delivery device 102 itself may be comprised of a material sufficient for neutral or positive buoyancy. In some embodiments, the floatation device 214 may be a buoy, an inflatable device, or the like. In other embodiments, the delivery device 102 may not include a floatation device 214. The floatation device 214 may be loosely coupled to the delivery device 102 via a chain, rope, string, or the like, such that the floatation device 214 acts as a drogue when the delivery device 102 is in free-fall. Additionally, in other embodiments, the floatation device 214 may be coupled to any portion of the delivery device 102.

In some embodiments, the elongated shaft 202, plurality of fins 208, payload holder 210, and attachment portion 212 may refer to portions of a structurally integral delivery device 102 that is manufacture as a single structure. In other embodiments, one or more of the elongated shaft 202, plurality of fins 208, payload holder 210, and attachment portion 212 may be separate components that are manufactured separately and fastened together to form the delivery device 102. Regarding embodiments in which one or more of the elongated shaft 202, plurality of fins 208, payload holder 210, and attachment portion 212 are separate components, the separate components may be fastened together by mechanical friction, adhesives, mechanical fasteners, or any other means of fastening. For example, in the illustrated embodiment of FIG. 2 the elongated shaft 202 and plurality of fins 208 are manufactured together as a single integral component, whereas the payload holder 210 and attachment portion 212 are each separately manufactured components that must be affixed to the elongated shaft 202. In the illustrated embodiment, the attachment portion 212 is affixed to the proximal end 204 of elongated shaft 202 via mechanical friction and adhesive. In the illustrated embodiment, the payload holder 210 is affixed to the distal end 206 of the elongated shaft 202 via a nut and a bolt.

In the illustrated embodiment, the elongated shaft 202, plurality of fins 208, payload holder 210, and attachment portion 212 are 3-D printed components made from a plastic or other similar material. In other embodiments, the elongated shaft 202, plurality of fins 208, payload holder 210, and attachment portion 212 may be made from any suitable material such as rubber, plastic, metal, ceramic, polymers, wood, fabric, or the like. Additionally, in other embodiments, the elongated shaft 202, plurality of fins 208, payload holder 210, and attachment portion 212 may be manufactured using any suitable manufacturing method such as molding, casting, machining, carving, or the like.

Figure 3:
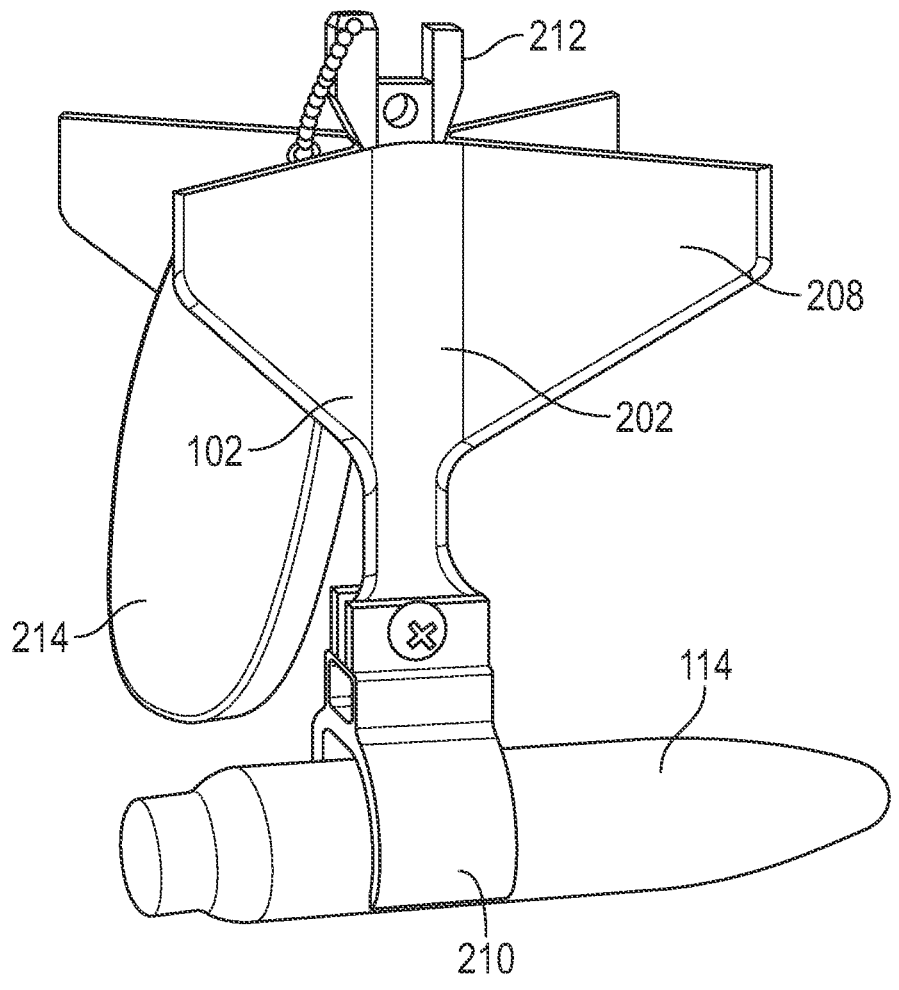
FIG. 3 depicts a delivery device detachably coupled to a payload according to an embodiment.

FIG. 3 depicts a delivery device 102 detachably coupled to a payload 114 according to an embodiment. In the illustrated embodiment, the delivery device 102 comprises an elongated shaft 202, a plurality of fins 208, an attachment portion 212, a floatation device 214, and a payload holder 210. The payload holder 210 is detachably coupled to the payload 114. In the illustrated embodiment, the payload 114 is a biologging tag. In the illustrated embodiment, the payload holder 210 comprises a pair of arms 216. The biologging tag is disposed between the pair of arms 216, resulting in a secure coupling of the biologging tag to the delivery device 102. The coupling of the payload 114 to the delivery device 102 may be secure enough to prevent detachment during flight but loose enough to ensure detachment after impact on the target surface 112.

In operation, the delivery device 102 is dropped from the aerial vehicle 106 onto a target surface 112. The proximal end 204 of the delivery device 102 is weighted as a result of the weight 218 and the payload 114. While in freefall, the weighted proximal end 204 and the plurality of fins 208 causes the biologging tag to impact the target surface 112 first. In the illustrated embodiment, the suction cups disposed on the underside of the biologging tag attach to the target surface 112. In the case of a marine mammal 118, the biologging tag may be attached to the posterior side of the marine mammal 118. The delivery device 102 may facilitate the impact of the biologging tag on the whale in a suction-cup down orientation. In that respect, the delivery device 102 may improve the flight characteristics of the payload 114 by reducing wobbling, pitching, rolling, spinning, and/or tumbling during freefall. The delivery device 102 may also allow the payload 114 to impact the target surface 112 with a force sufficient for attachment. The delivery device 102 may be dropped from a sufficient height to allow the suction cups to attach to the marine mammal 118. Depending on the weight of the payload 114, the delivery device 102 may need to be released at varying heights. In some embodiments, the payload 114 may need to achieve a sufficient impact velocity in order to impact the target surface 112 with a sufficient force to attach to the target surface 112 and/or detach from the delivery device 102. If a heavier payload 114 is being deployed, the delivery device 102 may be released from a lower height than if a lighter delivery device 102 is being deployed. The operator 116 of the aerial vehicle 106 may maneuver the aerial vehicle 106 to a height corresponding to the desired impact velocity.

At the time of delivery device 102 deployment, the aerial vehicle 106 may be positioned at a location substantially above the target surface 112 such that the payload 114 successfully impacts the target surface 112 after being dropped. The position of the aerial vehicle 106 at the time of deployment of the delivery device 102 may be adjusted based on environmental factors such as weather, precipitation, wind velocity, velocity of the target surface 112, and the like. The position of the aerial vehicle 106 at the time of deployment of the delivery device 102 may also be adjusted based on the speed of the aerial vehicle 106. For example, the aerial vehicle 106 may lead in front of the target surface 112 or lag behind the target surface 112 in order to counteract the effects of wind on the drop trajectory of the delivery device 102.

Figure 4:
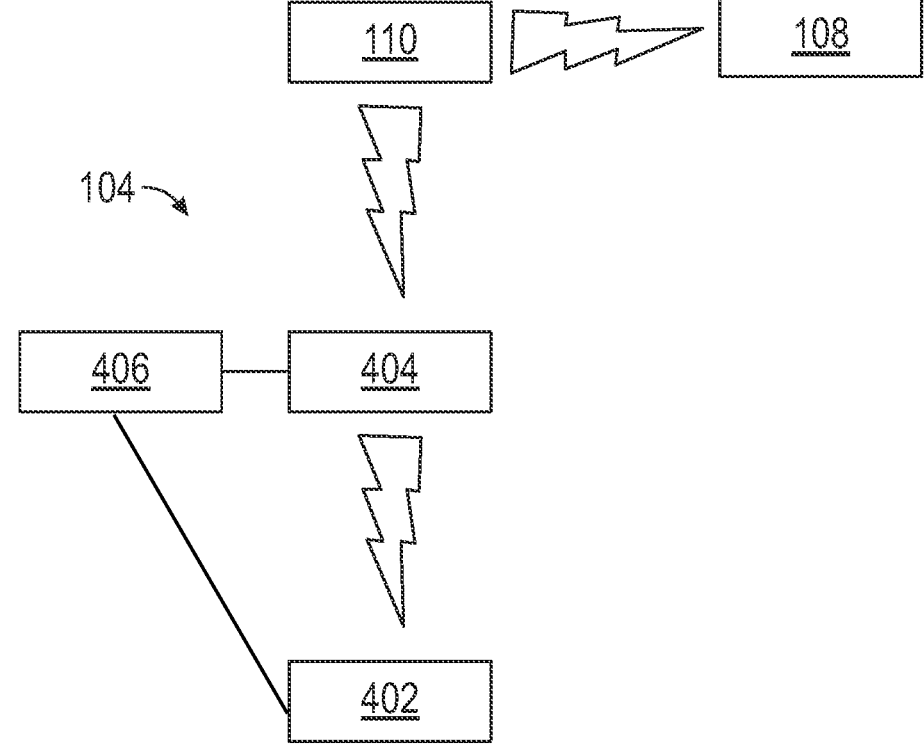
FIG. 4 depicts a system for operating a release mechanism as part of a delivery system on a UAV according to an embodiment.
Figure 9:
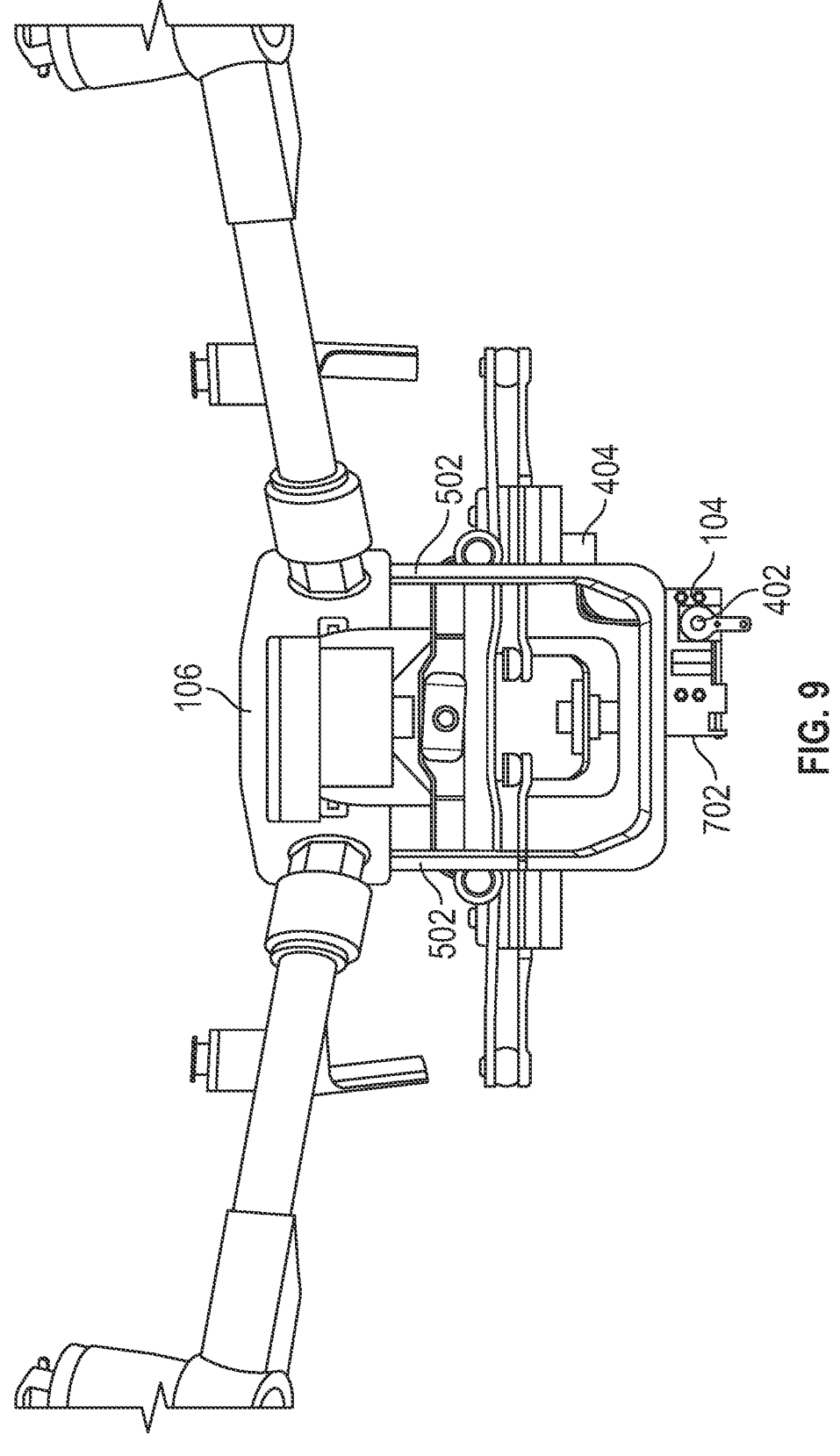
FIG. 9 depicts a release mechanism coupled to an aerial vehicle according to an embodiment.

FIG. 4 depicts a system for operating a release mechanism as part of a delivery system on a UAV according to an embodiment. The release mechanism 104 may be attached to an aerial vehicle 106, as shown in FIG. 9. The release mechanism 104 facilitates the controllable release of the delivery device 102. The release mechanism 104 may provide an attachment point for attachment of the delivery device 102 to the aerial vehicle 106. The release mechanism 104 may comprise a dropper device 402, a wireless receiver 404, and a power source 406.

In the illustrated embodiment, the dropper device 402, wireless receiver 404, and power source 406 are electrically coupled to one another via wires. The power source 406 may be any energy source that can be electrically coupled to the release mechanism 104. The battery 406 provides an energy source for the wireless receiver 404 and the dropper device 402. In the illustrated embodiment, the battery 406 is independent from the aerial vehicle 106. In other embodiments, the release mechanism 104 may utilize the aerial vehicle's 106 onboard battery 406 or energy source.

The wireless receiver 404 may be any receiver or transceiver capable of communicating via radio waves or other electromagnetic frequencies. The wireless receiver 404 may receive signals from a transmitter 110 via short range radio communications, such as Wi-Fi® or Bluetooth®, or via long range radio communications such as cellular frequencies. In the illustrated embodiment, the wireless receiver 404 is independent of the wireless communication interfaces contained within the aerial vehicle 106. In other embodiments, the release mechanism 104 may utilize the aerial vehicle's 106 onboard wireless receiver 404 or wireless communication interface. In the illustrated embodiment, the wireless receiver 404 is configured to receive signals transmitted by a transmitter 110.

The transmitter 110 may be any device capable of sending communications via radio waves or other electromagnetic frequencies. The transmitter 110 may be controlled by a human operator 116. In some embodiments, the transmitter 110 may be integrated into or electronically coupled with a controller 108. The controller 108 may be used to maneuver the aerial vehicle 106. The transmitter 110 may be integrated into the controller 108 via a switch located on the controller 108. Toggling the switch may allow the operator 116 to activate or deactivate the release mechanism 104. In some embodiments, the transmitter 110 is electrically coupled to and included within the controller 108. In other embodiments, the transmitter 110 and controller 108 may be separate. Integration of the transmitter 110 into the controller 108 allows for a single operator 116 to fly the aerial vehicle 106 and activate the release mechanism 104 on demand. This embodiment may eliminate lag time caused by the need for communication between the pilot of the aerial vehicle 106 and a dedicated operator 116 for the release mechanism 104. In the scenario 10 in which the target surface 112 is located on a marine mammal 118, such as a whale or dolphin, having a single operator 116 control the transmitter 110 and controller 108 also reduces the chance of dangerous/harmful events such as dropping the tag on sensitive areas of the marine mammal 118 (e.g., eyes or blowhole) due to miscommunication.

Communications between the transmitter and wireless receiver may occur via one or more networks. Wireless communications may occur under one or more wireless communication protocols, such as Bluetooth®, WiFi® (e.g., an IEEE 802.11 protocol), Long-Term Evolution® (LTE), WiMAX® (e.g., an IEEE 802.16 standard), a radio frequency ID (RFID) protocol, near-field communication (NFC), and/or other wireless communication protocols.

Figure 5:
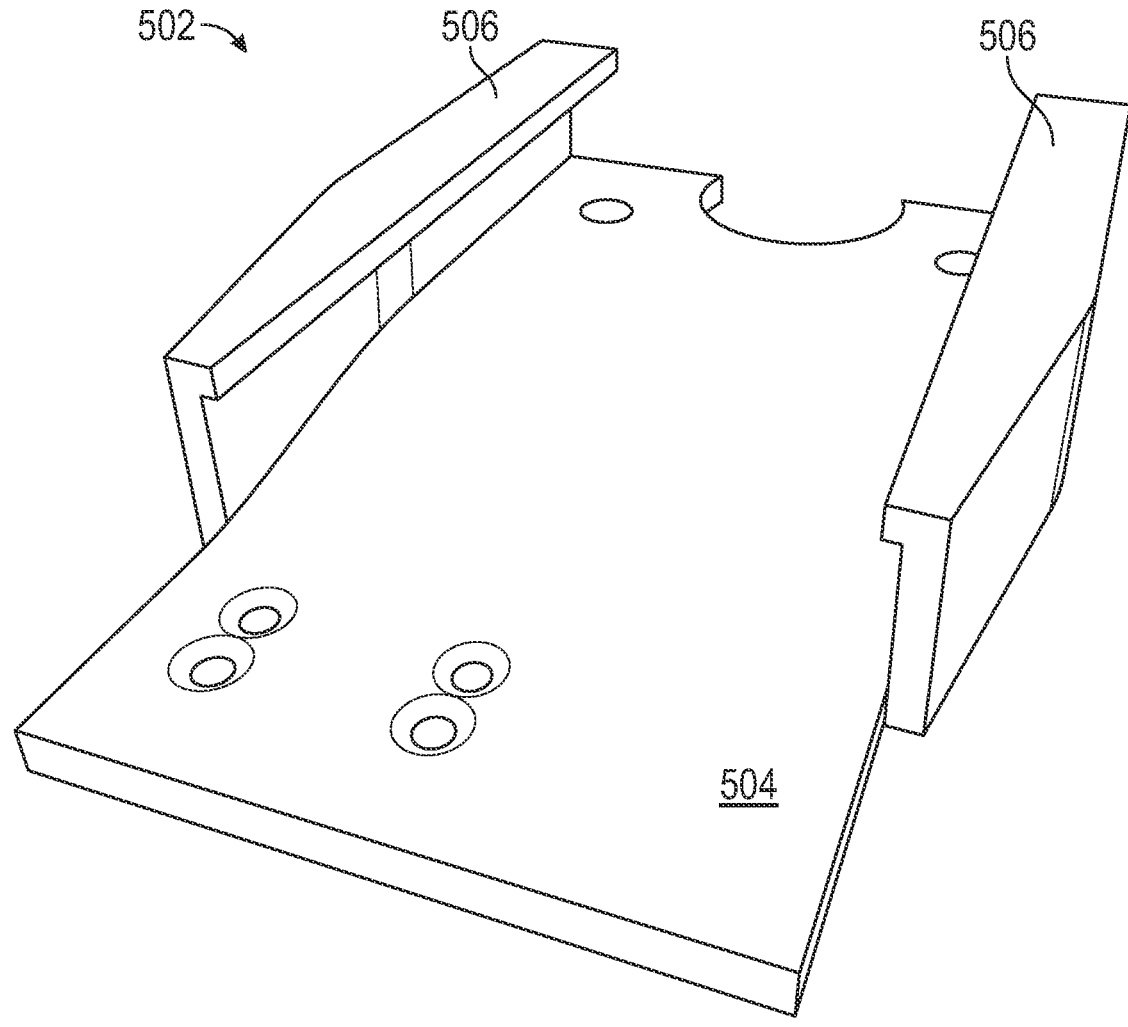
FIG. 5 depicts a perspective view of a mounting bracket according to an embodiment.

FIG. 5 depicts a mounting bracket 502 according to an embodiment. The mounting bracket 502 provides a structure for attaching the release mechanism 104 to the aerial vehicle 106. In the illustrated embodiment, the mounting bracket 502 comprises a rectangular plate 504 with elongated protrusions 506 extending along opposite edges of the rectangular plate 504. The elongated protrusions 506 extend in a substantially perpendicular direction to the plane of the rectangular plate 504. In the illustrated embodiment, multiple channels are formed through the rectangular plate 504 for attachment to the aerial vehicle 106 and to the release mechanism 104. In some embodiments, the support structure may be fastened to the aerial vehicle 106 and to the release mechanism 104 by various means of fastening, such as adhesive, tape, screws, bolts, clamps, ties, rope, or the like. In the illustrated embodiment, the mounting bracket 502 is dimensioned to attach to a DJI INSPIRE 2 drone.

Figure 6:
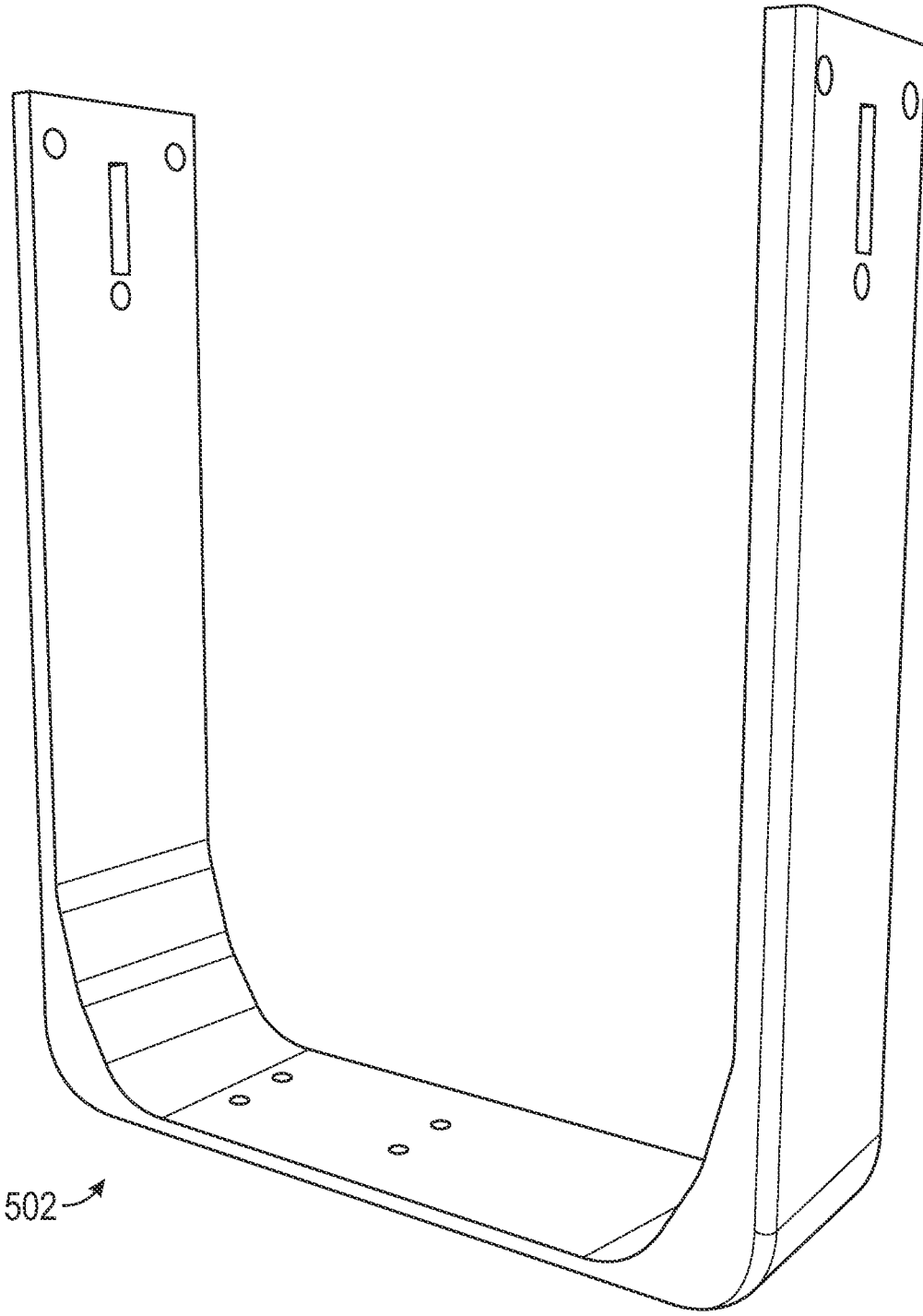
FIG. 6 depicts a perspective view of a mounting bracket according to an alternative embodiment.

It is to be understood that in some embodiments, the mounting bracket 502 may comprise a different shape or structure to accommodate the particular aerial vehicle 106 or release mechanism 104 being used. For example, FIG. 6 depicts a mounting bracket 502 according to an alternative embodiment. In the illustrated embodiment, the mounting bracket 502 is dimensioned to attach to a DJI MATRICE 210 V2 drone. In the illustrated embodiment, the mounting bracket 502 is substantially U-shaped. Multiple channels and slots are formed in the mounting bracket 502 for attachment to the aerial vehicle 106 and to the release mechanism 104. In the illustrated embodiment, the mounting bracket 502 may be attached to the underside of the aerial vehicle 106 via bolts or screws. In some embodiments, the mounting bracket 502 may be omitted entirely, and the release mechanism 104 may be attached directly to the aerial vehicle 106.

Figure 7:
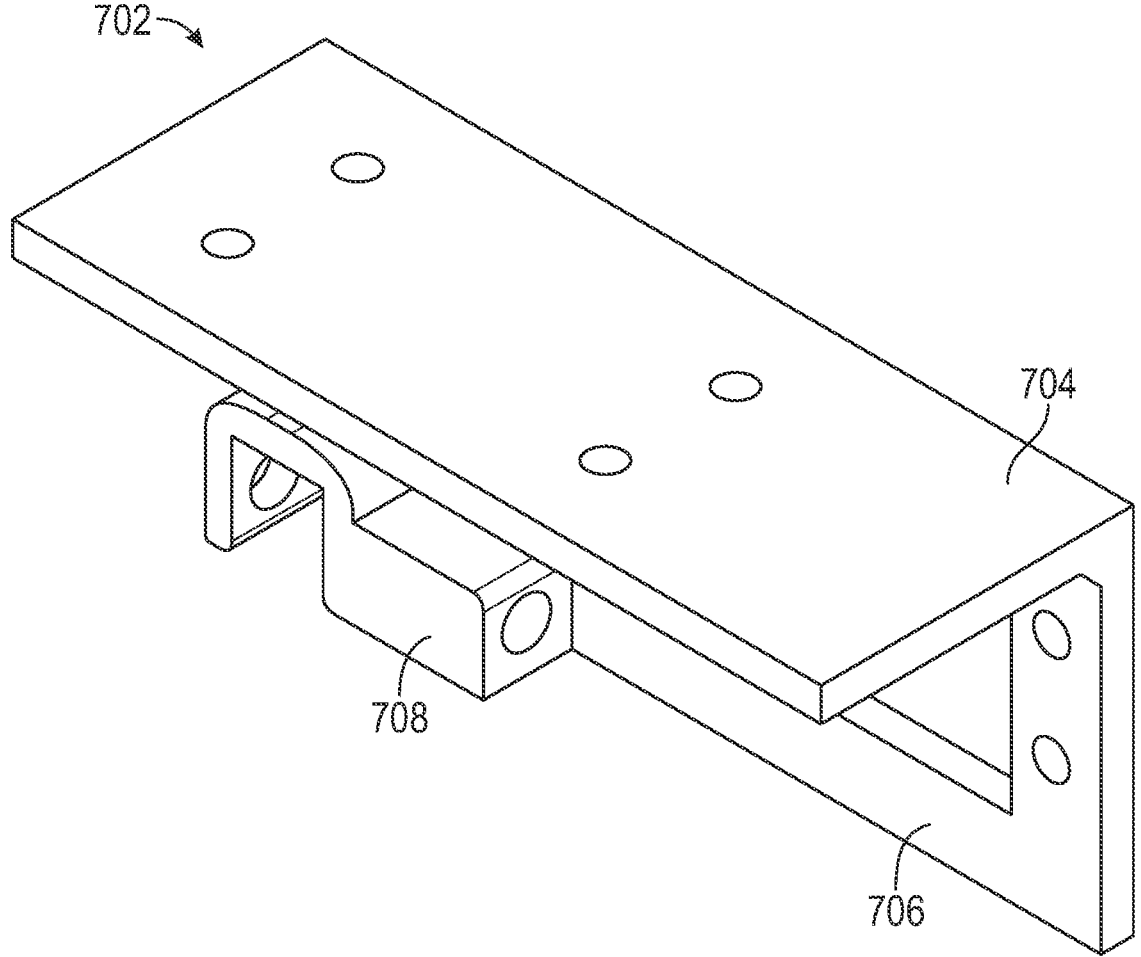
FIG. 7 depicts a perspective view of a dropper mount according to an embodiment.

FIG. 7 depicts a dropper mount 702 according to an embodiment. In some embodiments, the mounting bracket 502 may comprise a dropper mount 702. The dropper mount 702 provides a structure for facilitating the operation of the dropper device 402 and for attaching the dropper device 402 to the mounting bracket 502. In the illustrated embodiment, the dropper mount 702 comprises a substantially L-shaped bracket. Multiple channels are formed in the top portion 704 of the dropper mount 702 for attachment to the mounting bracket 502. Multiple channels are formed in the bottom portion 706 of the support bracket for attachment to the dropper device 402. In the illustrated embodiment, the dropper mount 702 additionally comprises a slotted protrusion 708 that is configured to facilitate operation of the dropper device 402. The rod 408 of a servo dropper may extend and retract through a channel formed through the slotted protrusion 708. The slot in the slotted protrusion 708 may be dimensioned to receive the attachment portion 212 of the delivery device 102. In the illustrated embodiment, a substantially ninety-degree angle is formed between the top portion 704 and the bottom portion 706 of the dropper mount 702. In other embodiments, the angle between the top portion 704 and bottom portion 706 may be less than or greater than ninety degrees. In some embodiments, the dropper mount 702 may be fastened to the mounting bracket 502 and to the dropper device 402 by various means of fastening, such as adhesive, tape, screws, bolts, clamps, ties, rope, or the like. It is to be understood that in some embodiments, the dropper mount 702 may comprise a different shape or structure to accommodate the specific type of dropper device 402 being used. In some embodiments, the dropper mount 702 may be omitted entirely, and the dropper device 402 may be attached directly to the mounting bracket 502 or aerial vehicle 106. Various embodiments can have different widths of dropper mount 702, different heights of dropper mount 702 and different lengths of dropper mount 702 as described in examples below.

For example, in some embodiments, the dropper mount 702 has a width of approximately 1.142 inches. In some embodiments, the dropper mount 702 may have a width of approximately 1.142 inches plus or minus about 20% (e.g., plus or minus 0.23 inches). In some embodiments, the dropper mount 702 may have a width of between approximately 0.5 and 2.0 inches. In various embodiments, the dropper mount 702 has a width of, or between any two, of the following dimensions: 0.5 inches, 0.6 inches, 0.7 inches, 0.8 inches, 0.9 inches, 1.0 inches, 1.1 inches, 1.2 inches, 1.3 inches, 1.4 inches, 1.5 inches, 1.6 inches, 1.7 inches, 1.8 inches, 1.9 inches and 2.0 inches. However, in some embodiments, the width of the dropper mount 702 may be less than 0.5 inches or greater than 2.0 inches.

For example, in some embodiments, the dropper mount 702 has a height of approximately 1.358 inches. In some embodiments, the dropper mount 702 may have a height of approximately 1.358 inches plus or minus about 20% (e.g., plus or minus 0.27 inches). In some embodiments, the dropper mount 702 may have a height of between approximately 0.5 and 2.0 inches. In various embodiments, the dropper mount 702 has a height of, or between any two, of the following dimensions: 0.5 inches, 0.6 inches, 0.7 inches, 0.8 inches, 0.9 inches, 1.0 inches, 1.1 inches, 1.2 inches, 1.3 inches, 1.4 inches, 1.5 inches, 1.6 inches, 1.7 inches, 1.8 inches, 1.9 inches and 2.0 inches. However, in some embodiments, the height of the dropper mount 702 may be less than 0.5 inches or greater than 2.0 inches.

For example, in some embodiments, the dropper mount 702 has a length of approximately 2.953 inches. In some embodiments, the dropper mount 702 may have a length of approximately 2.953 inches plus or minus about 20% (e.g., plus or minus 0.59 inches). In some embodiments, the dropper mount 702 may have a length of between approximately 1.5 and 4.5 inches. In various embodiments, the dropper mount 702 has a length of, or between any two, of the following dimensions: 1.5 inches, 1.6 inches, 1.7 inches, 1.8 inches, 1.9 inches, 2.0 inches, 2.1 inches, 2.2 inches, 2.3 inches, 2.4 inches, 2.5 inches, 2.6 inches, 2.7 inches, 2.8 inches, 2.9 inches, 3.0 inches, 3.1 inches, 3.2 inches, 3.3 inches, 3.4 inches, 3.5 inches, 3.6 inches, 3.7 inches, 3.8 inches, 3.9 inches, 4.0 inches, 4.1 inches, 4.2 inches, 4.3 inches, 4.4 inches, 4.5 inches. However, in some embodiments, the length of the dropper mount 702 may be less than 1.5 inches or greater than 4.5 inches.

In the illustrated embodiment, the mounting bracket 502 and dropper mount 702 are 3-D printed components made from a plastic or other similar material. In other embodiments, the mounting bracket 502 and dropper mount 702 may be made from any suitable material such as rubber, plastic, metal, ceramic, polymers, wood, fabric, or the like. Additionally, in other embodiments, the mounting bracket 502 and dropper mount 702 may be manufactured using any suitable manufacturing method such as molding, casting, machining, carving, or the like.

Figure 8:
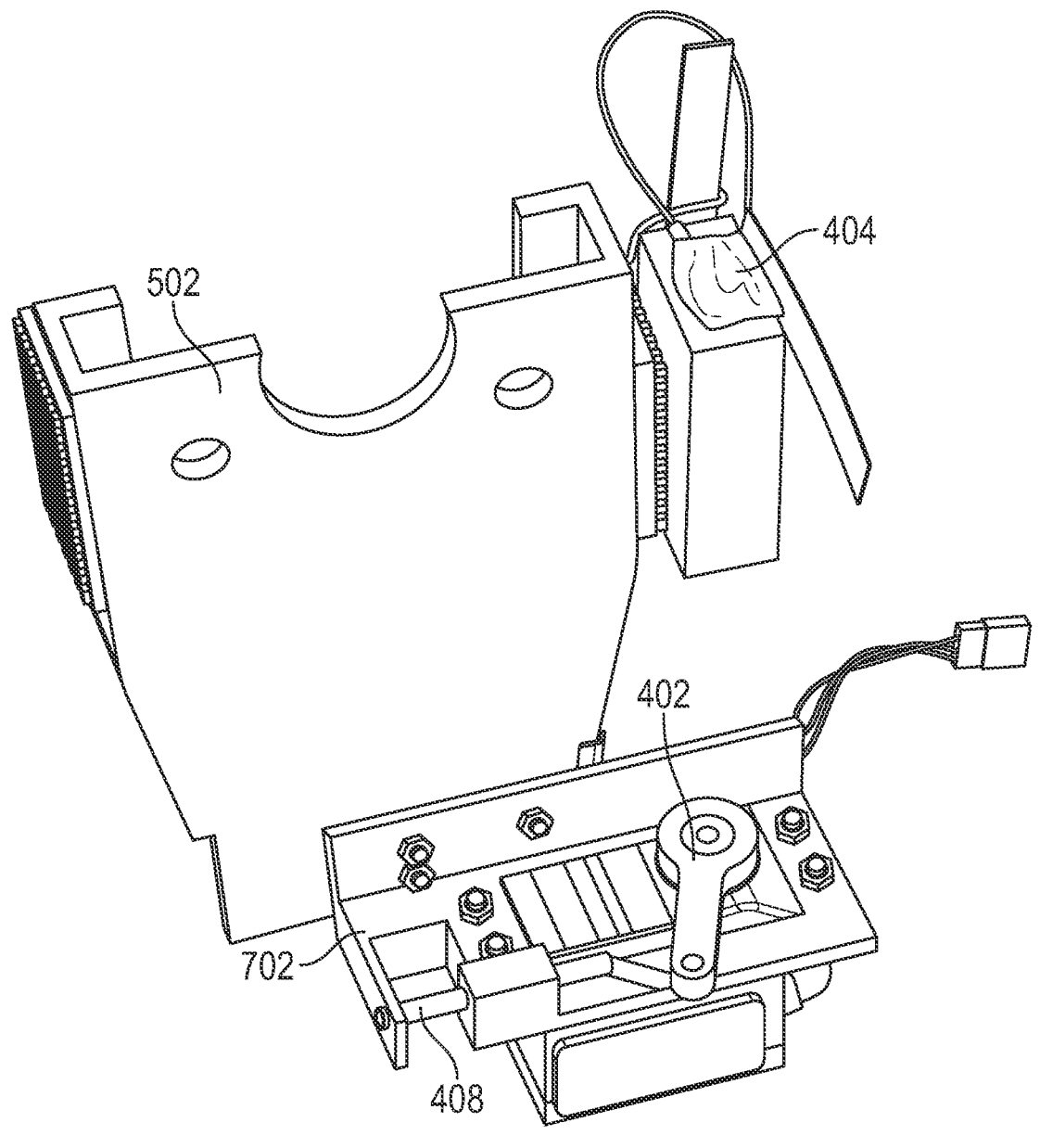
FIG. 8 depicts a release mechanism coupled to the mounting bracket of FIG. 5 according to an embodiment.

FIG. 8 depicts a release mechanism 104 attached to the mounting bracket 502 of FIG. 5 according to an embodiment. The dropper device 402 may carry and release the delivery device 102. The dropper device 402 may carry the delivery device 102 in a variety of ways. In some embodiments, the dropper device may be a servo dropper. In the illustrated embodiment, the dropper device 402 comprises a servo dropper. The servo dropper comprises a servomechanism that is rotationally connected to a rod 408. As the servomechanism generates rotational motion, the rod 408 extends and retracts in a cyclical manner. To couple the delivery device 102 to the dropper device 402, the rod 408 may be inserted through a servo dropper receptacle 1101 formed in the attachment portion 212 of the delivery device 102 (the servo dropper receptacle 1101 is shown and described below in FIG. 11 and FIG. 12). When the delivery device 102 is being carried by an aerial vehicle 106, the rod 408 is kept in a fully extended position such that the delivery device 102 is securely coupled to the aerial vehicle 106. When it is desirable to release the delivery device 102, the servomechanism retracts the rod 408, thereby releasing the delivery device 102 from the aerial vehicle 106. In other embodiments, the dropper device 402 may be any mechanism or structure capable of holding and releasing a delivery device 102. In other embodiments, the dropper device 402 may include a suction system, a magnet system, a retractable shelf system, a mechanical arm or claw system, a latch system, or the like. The dropper device 402 may include one or more logic modules implemented via hardware, software, and/or firmware that cause the dropper device 402 to function as described herein. In some embodiments, the aerial vehicle 106 may include one or more logic modules that communicate with the dropper device 402 to cause the dropper device 402 to perform functions described herein.

In the illustrated embodiment, the dropper device 402 is attached to the mounting bracket 502 via a dropper mount 702. The top portion 704 of the dropper mount 702 is attached to the rectangular plate 504 of the mounting bracket 502 via nuts and bolts. In some embodiments, the wireless receiver 404 and/or power source 406 may be attached to the mounting bracket 502 via hook and loop fasteners. In the illustrated embodiment, the wireless receiver 404 is attached via a hook and loop fastener that is located on the side of the elongated protrusion 506 of the mounting bracket 502. In other embodiments, one or more of the components of the release mechanism 104 may be attached at any location on the mounting bracket 502.

FIG. 9 depicts a release mechanism 104 attached to an aerial vehicle 106 according to an embodiment. The aerial vehicle 106 depicted in the figure comprises an unmanned aerial vehicle. In the illustrated embodiment, the mounting bracket 502 of FIG. 6 is affixed to the unmanned aerial vehicle. A release mechanism 104 comprising a wireless receiver 404, a dropper device 402, and a power source 406 is affixed to mounting bracket 502. In the illustrated embodiment, the dropper device 402 is attached to the mounting bracket 502 via a dropper mount 702. The release mechanism 104 and mounting bracket 502 may be securely attached to the aerial vehicle 106 such that there are no wobbly or loose components. In the illustrated embodiment, the mounting bracket 502 and release mechanism 104 are affixed to the undercarriage of the aerial vehicle 106. This placement allows for the delivery device 102 to be released without interfering with the flight of the aerial vehicle 106.

In other embodiments, the release mechanism 104 and mounting bracket 502 may be affixed to other locations on the aerial vehicle 106 such as the top, sides, front, back, wings, or interior.

In the illustrated embodiment, the release mechanism 104 is coupled to the aerial vehicle 106. The delivery device 102 may be detachably coupled to the release mechanism 104. Upon release or decoupling of the delivery device 102 from the release mechanism 104, the release mechanism 104 remains attached to the aerial vehicle 106. Thus, in the illustrated embodiment, the release mechanism 104 is able to operate as physically independent system from the delivery device 102. In other embodiments, the release mechanism 104 may be integrated into the delivery device 102. If the release mechanism 104 is integrated into the delivery device 102, the release mechanism 104 may fall with the delivery device 102 upon release from the aerial vehicle 106.

Figure 10:
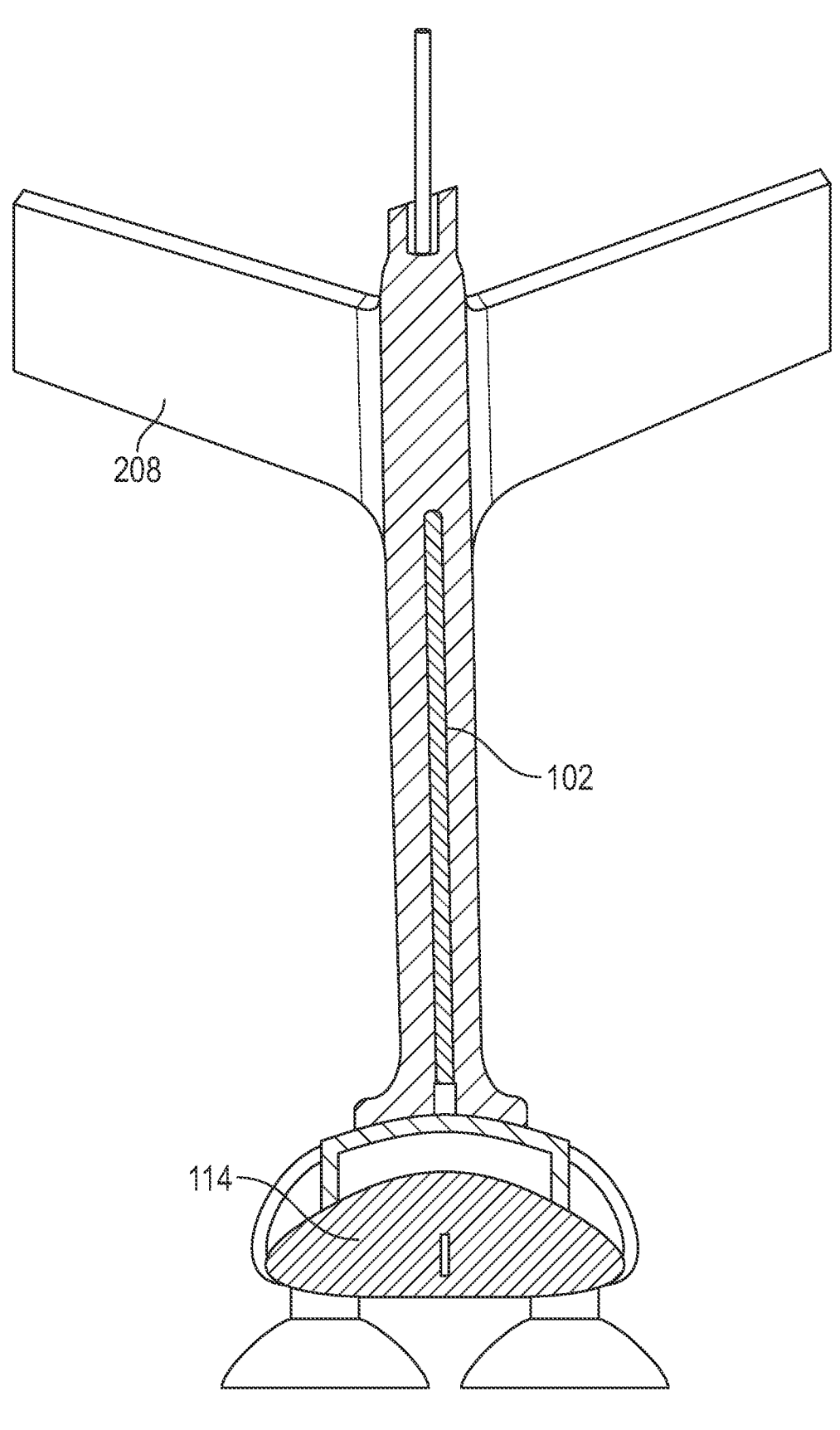
FIG. 10 depicts a delivery device detachably coupled to a payload according to an alternative embodiment.

It is to be understood by a person having ordinary skill in the art that the exact configuration of elements shown in the figures is not the only configuration of elements that can be used to perform the invention. For instance, FIG. 10 depicts a delivery device 102 according to an alternative embodiment as compared to the embodiment depicted in FIG. 2 and FIG. 3. The delivery device 102 depicted in FIG. 10 is detachably coupled to a payload 114. The delivery device 102 comprises an elongated shaft 202, a plurality of fins 208 extending along the elongated shaft 202, a payload holder 210 coupled to the distal end 206 of the elongated shaft 202, and an attachment portion 212 coupled to the proximal end 204 of the elongated shaft 202. In the illustrated embodiment, a weight 218 and floatation device 214 are omitted from the delivery device 102. The fins 208 form a substantially parallelogram shape. The fins 208 extend along a portion of the elongated shaft 202 that is proximal to the proximal end 204 of the elongated shaft 202. The fins 208 extend along a minority of the length of the elongated shaft 202 and angle toward the proximal end 204 of the elongated shaft 202.

Figure 11:
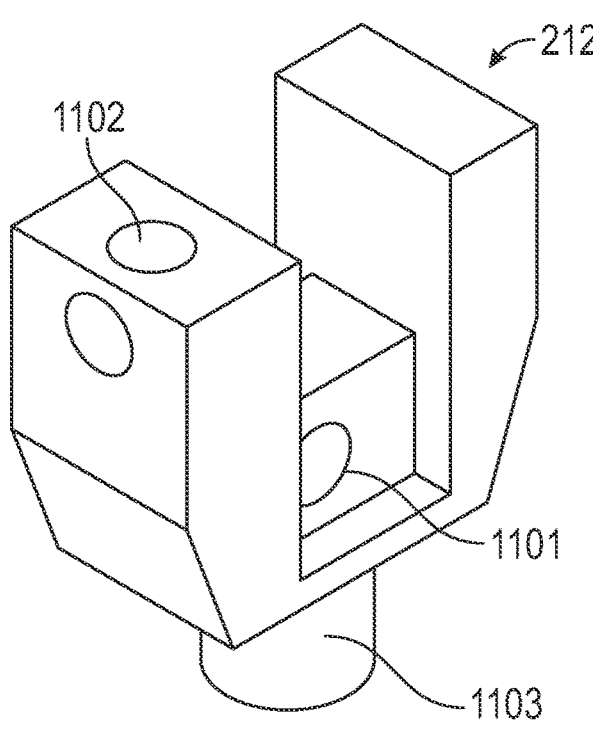
FIG. 11 depicts an attachment device for the delivery device according to an embodiment.

FIG. 11 depicts an attachment portion 212 for a delivery device 102 according to an embodiment. In the illustrated embodiment, the attachment portion 212 comprises a servo dropper receptacle 1101 that receives the rod 408 of the dropper device 402 and an attachment point 1103 that is fitted to insert into the proximal end 204 of the elongated shaft 202. The attachment portion 212 further comprises a channel 1102 that may be used to couple the floatation device 214 to the attachment portion 212. Various embodiments can have different sizes of attachment point 1103, different heights of attachment portion 212, different lengths of attachment portion 212 and different widths of attachment portion 212 as described in examples below.

For example, in some embodiments, the attachment point 1103 can have a diameter of 0.39 inches. In some embodiments, the diameter of the attachment point 1103 may be approximately 0.39 inches, plus or minus about 20% (e.g., plus or minus 0.078 inches). In Various embodiments, the diameter of the attachment point 1103 may be between 0.25 and inches. In some embodiments, the diameter of the attachment point 1103 can be any of, or between any two, of the following dimensions: 0.25 inches, 0.26 inches, 0.27 inches, 0.28 inches, 0.29 inches, 0.30 inches, 0.31 inches, 0.32 inches, 0.33 inches, 0.34 inches, 0.35 inches, inches, 0.37 inches, 0.38 inches, 0.39 inches, 0.40 inches, 0.41 inches, 0.42 inches, 0.43 inches, 0.44 inches, 0.45 inches, 0.46 inches, 0.47 inches, 0.48 inches, 0.49 inches, 0.50 inches, inches, 0.52 inches, 0.53 inches, 0.54 inches, and 0.55 inches. However, in various embodiments, the diameter of the attachment point 1103 may be less than 0.25 inches or greater than 0.55 inches.

For example, in some embodiments, the attachment portion 212 has a height of approximately 1.34 inches. In some embodiments, the attachment portion 212 may have a height of approximately 1.34 inches plus or minus about 20% (e.g., plus or minus 0.27 inches). In some embodiments, the attachment portion 212 may have a height of between approximately 0.5 and 2.0 inches. In various embodiments, the attachment portion 212 has a height of, or between any two, of the following dimensions: 0.5 inches, 0.6 inches, 0.7 inches, inches, 0.9 inches, 1.0 inches, 1.1 inches, 1.2 inches, 1.3 inches, 1.4 inches, 1.5 inches, 1.6 inches, 1.7 inches, 1.8 inches, 1.9 inches and 2.0 inches. However, in some embodiments, the height of the attachment portion 212 may be less than 0.5 inches or greater than 2.0 inches.

For example, in some embodiments, the attachment portion 212 has a length of approximately 1.10 inches. In some embodiments, the attachment portion 212 may have a length of approximately 1.1 inches plus or minus about 20% (e.g., plus or minus 0.22 inches). In some embodiments, the attachment portion 212 may have a length of between approximately 0.5 and 2.0 inches. In various embodiments, the attachment portion 212 has a length of, or between any two, of the following dimensions: 0.5 inches, 0.6 inches, 0.7 inches, inches, 0.9 inches, 1.0 inches, 1.1 inches, 1.2 inches, 1.3 inches, 1.4 inches, 1.5 inches, 1.6 inches, 1.7 inches, 1.8 inches, 1.9 inches and 2.0 inches. However, in some embodiments, the length of the attachment portion 212 may be less than 0.5 inches or greater than 2.0 inches.

For example, in some embodiments, the attachment portion 212 has a width of approximately 0.55 inches. In some embodiments, the attachment portion 212 may have a width of approximately 0.55 inches plus or minus about 20% (e.g., plus or minus 0.11 inches). In some embodiments, the attachment portion 212 may have a width of between approximately and 1.0 inches. In various embodiments, the attachment portion 212 has a width of, or between any two, of the following dimensions: 0.2 inches, 0.25 inches, 0.30 inches, 0.35 inches, 0.40 inches, 0.45 inches, 0.55 inches, 0.60 inches, 0.65 inches, 0.7 inches, 0.75 inches, inches, 0.85 inches, 0.90 inches, 0.95 inches and 1.0 inches. However, in some embodiments, the width of the attachment portion 212 may be less than 0.2 inches or greater than 1.0 inches.

Figure 12:
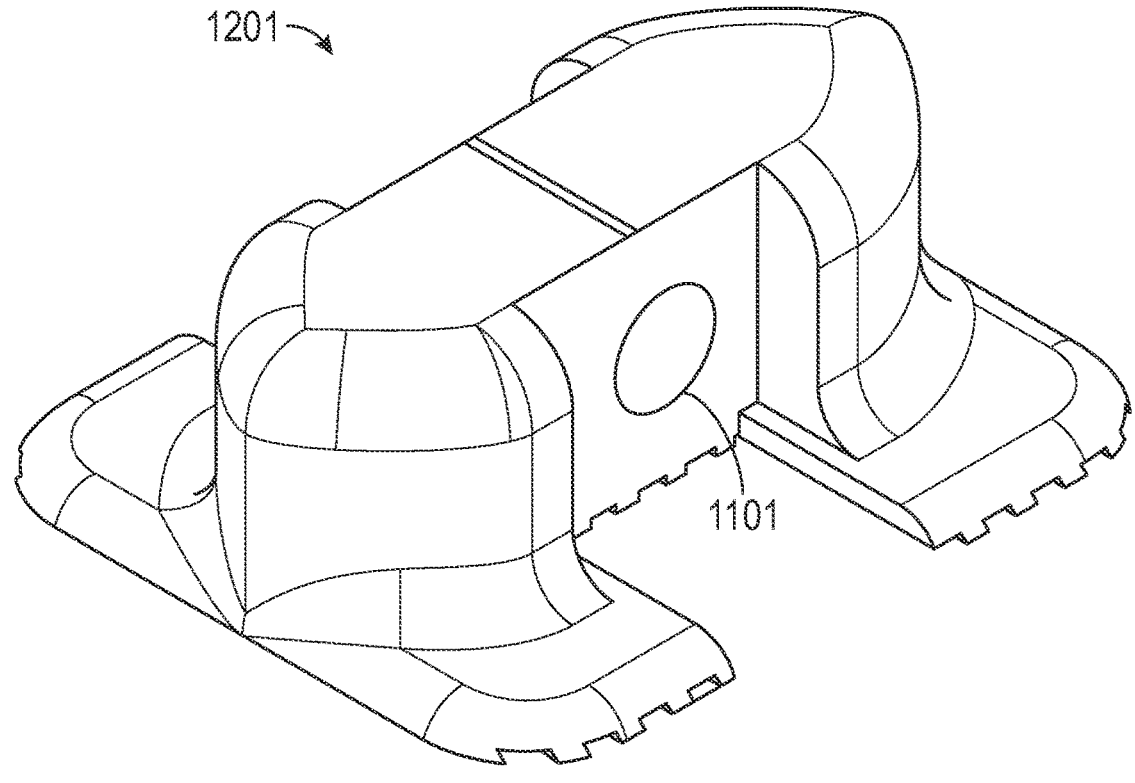
FIG. 12 depicts an attachment device for the CATS tag according to an alternative embodiment.

FIG. 12 depicts an attachment device for the CATS tag according to an alternative embodiment. The attachment device may be used in combination with heavier payloads. In the illustrated embodiment, the attachment portion 1201 comprises a servo dropper receptacle 1101 fitted for the same dropper device 402 received by the servo dropper receptacle 1101 on the attachment portion 212. Various embodiments can have different heights of attachment portion 1201, different lengths of attachment portion 1201 and different width of attachment portion 1201 as described in examples below.

For example, in some embodiments, the attachment portion 1201 has a height of approximately 0.449 inches. In some embodiments, the attachment portion 1201 may have a height of approximately 0.449 inches plus or minus about 20% (e.g., plus or minus 0.09 inches). In some embodiments, the attachment portion 1201 may have a height of between approximately 0.2 and 1.0 inches. In various embodiments, the attachment portion 1201 has a height of, or between any two, of the following dimensions: 0.2 inches, 0.25 inches, 0.30 inches, 0.35 inches, 0.40 inches, 0.45 inches, 0.55 inches, 0.60 inches, 0.65 inches, 0.7 inches, inches, 0.80 inches, 0.85 inches, 0.90 inches, 0.95 inches and 1.0 inches. However, in some embodiments, the height of the attachment portion 1201 may be less than 0.2 inches or greater than 1.0 inches.

For example, in some embodiments, the attachment portion 1201 has a length of approximately 1.271 inches. In some embodiments, the attachment portion 1201 may have a length of approximately 1.271 inches plus or minus about 20% (e.g., plus or minus inches). In some embodiments, the attachment portion 1201 may have a length of between approximately 0.5 and 2.0 inches. In various embodiments, the attachment portion 1201 has a length of, or between any two, of the following dimensions: 0.5 inches, 0.6 inches, inches, 0.8 inches, 0.9 inches, 1.0 inches, 1.1 inches, 1.2 inches, 1.3 inches, 1.4 inches, 1.5 inches, 1.6 inches, 1.7 inches, 1.8 inches, 1.9 inches and 2.0 inches. However, in some embodiments, the length of the attachment portion 1201 may be less than 0.5 inches or greater than 2.0 inches.

For example, in some embodiments, the attachment portion 1201 has a width of approximately 1.095 inches. In some embodiments, the attachment portion 1201 may have a width of approximately 1.095 inches plus or minus about 20% (e.g., plus or minus 0.219 inches). In some embodiments, the attachment portion 1201 may have a width of between approximately 0.5 and 2.0 inches. In various embodiments, the attachment portion 1201 has a width of, or between any two, of the following dimensions: 0.5 inches, 0.6 inches, 0.7 inches, inches, 0.9 inches, 1.0 inches, 1.1 inches, 1.2 inches, 1.3 inches, 1.4 inches, 1.5 inches, 1.6 inches, 1.7 inches, 1.8 inches, 1.9 inches and 2.0 inches. However, in some embodiments, the width of the attachment portion 1201 may be less than 0.5 inches or greater than 2.0 inches.

Figure 13:
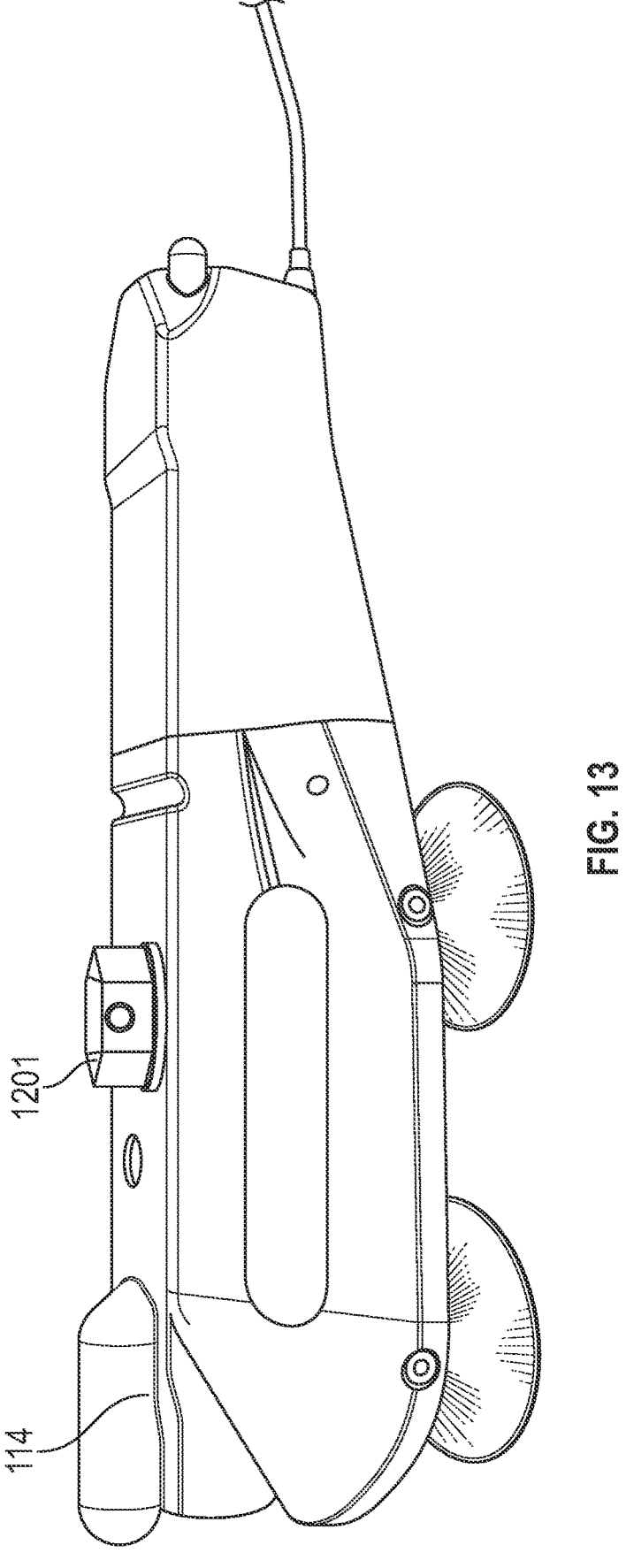
FIG. 13 depicts the attachment device of FIG. 12 coupled directly to the payload according to an embodiment.

FIG. 13 depicts the attachment device 1201 of FIG. 12 coupled directly to the payload 114 according to an embodiment. In the illustrated embodiment, the attachment portion 1201 is coupled directly to the payload 114, without the need for the delivery device 102. The attachment portion 1201 and payload 114 may be coupled by adhesives, mechanical fasteners, or any other means of fastening. The attachment portion 1201 may be detachably coupled or permanently coupled to the payload 114. Additionally, in some embodiments, the attachment portion 1201 may be part of the payload 114 itself, rather than an independent component. In some embodiments, the payload 114 that is coupled to the attachment portion 1201 may be a CATS tag. Various systems and methods are described herein primarily in the context of using a drone to deploy a biologging tag or other tracking device onto a whale. However, the inventors contemplate applicability of the disclosed systems and methods to any of a wide variety of alternative applications.

As used in the description and claims, the singular form "a", "an" and "the" include both singular and plural references unless the context clearly dictates otherwise. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. "Consisting of" shall mean that the devices, systems, and methods include the recited elements and exclude anything more than a trivial or inconsequential element or step. Embodiments defined by each of these transitional terms are within the scope of this disclosure.

Certain Embodiments Relating to Methods and Systems for Deploying a Payload from an Aerial Surface onto a Target Surface The following are non-limiting examples of certain embodiments of systems and methods for deploying a payload onto a target surface from an aerial vehicle. Other embodiments may include one or more other features, or different features, other than what is disclosed herein.

Embodiment 1: A system for deploying a payload from an aerial vehicle onto a target surface, the system comprising: a delivery device comprising: an elongated shaft comprising a proximal end and a distal end; a plurality of fins extending along the elongated shaft; an attachment portion coupled to the proximal end of the elongated shaft, wherein the attachment portion is detachably couplable to the aerial vehicle; and a payload holder coupled to the distal end of the elongated shaft, wherein the payload holder is detachably couplable to the payload, wherein the payload holder is configured to detach from the payload in response to the delivery device impacting the target surface; and a release mechanism coupled to the aerial vehicle, the release mechanism comprising: a wireless receiver configured to receive a signal from a transmitter; and a dropper device electrically coupled to the wireless receiver and detachably couplable to the attachment portion of the delivery device, wherein the dropper device is configured to detach from the attachment portion in response to the wireless receiver receiving a signal from the transmitter to release the delivery device.

Embodiment 2: The system of embodiment 1, wherein the payload holder comprises a pair of arms configured to wrap around the payload.

Embodiment 3: The system of embodiment 1, further comprising a floatation device coupled to the delivery device.

Embodiment 4: The system of embodiment 3, wherein the floatation device is coupled to the attachment portion.

Embodiment 5: The system of embodiment 1, further comprising a weight coupled to the payload holder.

Embodiment 6: The system of embodiment 1, wherein the dropper device comprises a servo dropper.

Embodiment 7: The system of embodiment 1, further comprising a mounting bracket coupled to the aerial vehicle, wherein the mounting bracket is configured to secure the release mechanism to the aerial vehicle.

Embodiment 8: The system of embodiment 1, wherein the aerial vehicle comprises an unmanned aerial vehicle.

Embodiment 9: The system of embodiment 1, wherein the target surface comprises a surface on a marine mammal.

Embodiment 10: The system of embodiment 1, wherein the target surface comprises a moving surface.

Embodiment 11: The system of embodiment 1, wherein the payload comprises a biologging tag.

Embodiment 12: A system for deploying a payload from an aerial vehicle onto a body of an animal, the system comprising: a delivery device detachably couplable to the aerial vehicle, the delivery device comprising: an elongated shaft comprising a proximal end and a distal end; a plurality of fins extending along the elongated shaft; and a payload holder coupled to the distal end of the elongated shaft, wherein the payload holder is detachably couplable to the payload, wherein the payload holder is configured to detach from the payload in response to the delivery device impacting the body of the animal.

Embodiment 13: The system of embodiment 12, wherein the delivery device further comprises an attachment portion coupled to the proximal end of the elongated shaft, wherein the attachment portion is detachably couplable to the aerial vehicle.

Embodiment 14: The system of embodiment 12, further comprising a floatation device coupled to the delivery device.

Embodiment 15: The system of embodiment 14, wherein the floatation device is coupled to the attachment portion.

Embodiment 16: The system of embodiment 12, wherein the payload holder comprises a pair of arms configured to wrap around the payload.

Embodiment 17: The system of embodiment 12, further comprising a weight coupled to the payload holder.

Embodiment 18: The system of embodiment 12, further comprising a release mechanism coupled to the aerial vehicle, the release mechanism comprising: a wireless receiver configured to receive a signal from a transmitter; and a dropper device electrically coupled to the wireless receiver and detachably couplable to the delivery device, wherein the dropper device is configured to detach from the delivery device in response to the wireless receiver receiving a signal from the transmitter to release the delivery device.

Embodiment 19: The system of embodiment 18, wherein the dropper device comprises a servo dropper.

Embodiment 20: The system of embodiment 18, further comprising a mounting bracket coupled to the aerial vehicle, wherein the mounting bracket is configured to secure the release mechanism to the aerial vehicle.

Embodiment 21: The system of embodiment 12, wherein the aerial vehicle comprises an unmanned aerial vehicle.

Embodiment 22: The system of embodiment 12, wherein the target surface comprises a surface on a marine mammal.

Embodiment 23: The system of embodiment 12, wherein the target surface comprises a moving surface.

Embodiment 24: The system of embodiment 12, wherein the payload comprises a biologging tag.

Embodiment 25: A method for deploying a payload from an aerial vehicle onto a target surface, the method comprising: detachably coupling a delivery device to the aerial vehicle via a dropper device, wherein the delivery device comprises: an elongated shaft comprising a proximal end and a distal end, a plurality of fins extending along the elongated shaft, and a payload holder coupled to the distal end of the elongated shaft, wherein the payload holder is detachably couplable to the payload; positioning the aerial vehicle substantially above the target surface; receiving a signal at a wireless receiver to detach the delivery device from the aerial vehicle; transmitting the signal from the wireless receiver to the dropper device; detaching the delivery device from the aerial vehicle via the dropper device; impacting the delivery device onto the target surface; and detaching the delivery device from the payload.

Embodiment 26: The method of embodiment 25, wherein detaching the delivery device from the payload occurs in response to impacting the delivery device onto the target surface.

Embodiment 27: The method of embodiment 25, wherein positioning the aerial vehicle substantially above the target surface comprises positioning the aerial vehicle above a body of an animal.

Embodiment 28: A method for deploying a payload from an aerial vehicle onto a target surface, the method comprising: detachably coupling a delivery device to the aerial vehicle via a release mechanism, wherein the delivery device comprises: an elongated shaft comprising a proximal end and a distal end, a plurality of fins extending along the elongated shaft, and a payload holder coupled to the distal end of the elongated shaft, wherein the payload holder is detachably couplable to the payload; positioning the aerial vehicle substantially above the target surface; in response to the aerial vehicle being positioned substantially above the target surface, detaching the delivery device from the aerial vehicle via the release mechanism; impacting the delivery device onto the target surface; and detaching the delivery device from the payload.

Embodiment 29: The method of embodiment 28, wherein detaching the delivery device from the payload occurs in response to impacting the delivery device onto the target surface.

Embodiment 30: A system for deploying a payload from an aerial vehicle onto a target surface, the system comprising: a delivery device comprising: an elongated shaft comprising a proximal end and a distal end; a plurality of fins extending along the elongated shaft; an attachment portion coupled to the proximal end of the elongated shaft, wherein the attachment portion is detachably couplable to the aerial vehicle; a floatation device coupled to the attachment portion; a payload holder coupled to the distal end of the elongated shaft, wherein the payload holder is detachably couplable to the payload, the payload holder comprising a pair of arms configured to wrap around the payload, wherein the payload holder is configured to detach from the payload in response to the delivery device impacting the target surface; and a weight coupled to the payload holder; a release mechanism coupled to the aerial vehicle, the release mechanism comprising: a wireless receiver configured to receive a signal from a transmitter; a dropper device electrically coupled to the wireless receiver and detachably couplable to the attachment portion of the delivery device, wherein the dropper device is configured to detach from the attachment portion in response to the wireless receiver receiving a signal from the transmitter to release the delivery device; and a battery electrically coupled to the wireless receiver and the dropper device; and a mounting bracket coupled to the aerial vehicle, wherein the mounting bracket is configured to secure the release mechanism to the aerial vehicle.

Embodiment 31: The system of embodiment 30, wherein the aerial vehicle comprises an unmanned aerial vehicle.

Embodiment 32: A system for deploying a payload from an aerial vehicle onto a target surface, the system comprising: an attachment portion coupled to the payload; and a release mechanism comprising: a wireless receiver configured to receive a signal from a transmitter; and a dropper device electrically coupled to the wireless receiver and detachably couplable to the payload, wherein the dropper device is configured to detach from the payload in response to the wireless receiver receiving a signal from the transmitter to release the payload.

Embodiment 33: The system of embodiment 32, wherein the release mechanism is detachable coupled to the payload via an attachment device (the topper) wherein: the release mechanism is detachable coupled to the attachment device; and the attachment device is coupled to the payload.

Embodiment 34: The system of embodiment 32, further comprising a delivery device detachably coupled to the release mechanism, wherein the delivery device comprises: an elongated shaft comprising a proximal end and a distal end; a plurality of fins extending along the elongated shaft; an attachment portion coupled to the proximal end of the elongated shaft, wherein the attachment portion is detachably couplable to the aerial vehicle; and a payload holder coupled to the distal end of the elongated shaft, wherein the payload holder is detachably couplable to the payload, wherein the payload holder is configured to detach from the payload in response to the delivery device impacting the target surface;

Embodiment 35: A method for deploying a payload from an aerial vehicle onto a target surface, the method comprising: detachably coupling a payload to the aerial vehicle via a release mechanism, wherein the release mechanism comprises: a wireless receiver configured to receive a signal from a transmitter and a dropper device electrically coupled to the wireless receiver; positioning the aerial vehicle substantially above the target surface; in response to the aerial vehicle being positioned substantially above the target surface, detaching the payload from the aerial vehicle via the release mechanism; and impacting the payload onto the target surface.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for deploying a payload from an aerial vehicle onto a target surface, the system comprising:
a delivery device comprising:
an elongated shaft comprising a proximal end and a distal end;
a plurality of fins extending along the elongated shaft;
an attachment portion coupled to the proximal end of the elongated shaft, wherein the attachment portion is detachably couplable to the aerial vehicle; and
a payload holder coupled to the distal end of the elongated shaft, wherein the payload holder is detachably couplable to the payload, wherein the payload holder is configured to detach from the payload in response to the delivery device impacting the target surface; and a release mechanism coupled to the aerial vehicle, the release mechanism comprising:
a wireless receiver configured to receive a signal from a transmitter; and
a dropper device electrically coupled to the wireless receiver and detachably couplable to the attachment portion of the delivery device, wherein the dropper device is configured to detach from the attachment portion in response to the wireless receiver receiving a signal from the transmitter to release the delivery device.

2. The system of claim 1, wherein the payload holder comprises a pair of arms configured to wrap around the payload.

3. The system of claim 1, further comprising a floatation device coupled to the delivery device.

4. The system of claim 3, wherein the floatation device is coupled to the attachment portion.

5. The system of claim 1, further comprising a weight coupled to the payload holder.

6. The system of claim 1, wherein the dropper device comprises a servo dropper.

7. The system of claim 1, further comprising a mounting bracket coupled to the aerial vehicle, wherein the mounting bracket is configured to secure the release mechanism to the aerial vehicle.

8. The system of claim 1, wherein the aerial vehicle comprises an unmanned aerial vehicle.

9. The system of claim 1, wherein the target surface comprises a surface on a marine mammal.

10. The system of claim 1, wherein the target surface comprises a moving surface.

11. The system of claim 1, wherein the payload comprises a biologging tag.

12. A system for deploying a payload from an aerial vehicle onto a body of an animal, the system comprising:
a delivery device detachably couplable to the aerial vehicle, the delivery device comprising:
an elongated shaft comprising a proximal end and a distal end;
a plurality of fins extending along the elongated shaft; and
a payload holder coupled to the distal end of the elongated shaft, wherein the payload holder is detachably couplable to the payload, wherein the payload holder is configured to detach from the payload in response to the delivery device impacting the body of the animal.

13. The system of claim 12, wherein the delivery device further comprises an attachment portion coupled to the proximal end of the elongated shaft, wherein the attachment portion is detachably couplable to the aerial vehicle.

14. The system of claim 12, further comprising a floatation device coupled to the delivery device.

15. The system of claim 14, wherein the floatation device is coupled to the attachment portion.

16. The system of claim 12, wherein the payload holder comprises a pair of arms configured to wrap around the payload.

17. The system of claim 12, further comprising a weight coupled to the payload holder.

18. A method for deploying a payload from an aerial vehicle onto a target surface, the method comprising:
detachably coupling a delivery device to the aerial vehicle via a dropper device, wherein the delivery device comprises: an elongated shaft comprising a proximal end and a distal end, a plurality of fins extending along the elongated shaft, and a payload holder coupled to the distal end of the elongated shaft, wherein the payload holder is detachably couplable to the payload;

positioning the aerial vehicle substantially above the target surface;

receiving a signal at a wireless receiver to detach the delivery device from the aerial vehicle;

transmitting the signal from the wireless receiver to the dropper device;

detaching the delivery device from the aerial vehicle via the dropper device;

impacting the delivery device onto the target surface; and detaching the delivery device from the payload.

19. The method of claim 18, wherein detaching the delivery device from the payload occurs in response to impacting the delivery device onto the target surface.

20. The method of claim 18, wherein positioning the aerial vehicle substantially above the target surface comprises positioning the aerial vehicle above a body of an animal.

\* \* \* \* \*